(12) United States Patent
Huang et al.

(10) Patent No.: US 10,244,561 B2
(45) Date of Patent: Mar. 26, 2019

(54) INFORMATION TRANSMISSION METHOD, USER-SIDE DEVICE, AND NETWORK-SIDE DEVICE

(71) Applicant: Huawei Technologies Co., Ltd., Shenzhen (CN)

(72) Inventors: Wenwen Huang, Shanghai (CN); Yueying Zhao, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 15/449,271

(22) Filed: Mar. 3, 2017

(65) Prior Publication Data

US 2017/0181194 A1 Jun. 22, 2017

Related U.S. Application Data

(63) Continuation of application No. PCT/CN2015/078215, filed on May 4, 2015.

(30) Foreign Application Priority Data

Sep. 4, 2014 (CN) ................. PCT/CN2014/085932
Dec. 30, 2014 (CN) ................. PCT/CN2014/095676

(51) Int. Cl.
*H04W 74/08* (2009.01)
*H04W 72/04* (2009.01)

(52) U.S. Cl.
CPC ....... *H04W 74/0833* (2013.01); *H04W 72/04* (2013.01); *H04W 72/0406* (2013.01); *H04W 74/08* (2013.01)

(58) Field of Classification Search
CPC ... H04W 4/70; H04W 4/005; H04W 74/0833; H04W 72/042; H04W 72/0446
See application file for complete search history.

(56) References Cited

U.S. PATENT DOCUMENTS

2014/0075181 A1 3/2014 Raghupathy et al.
2014/0098761 A1 4/2014 Lee et al.
(Continued)

FOREIGN PATENT DOCUMENTS

CN 102547990 A 7/2012
CN 103209062 A 7/2013
(Continued)

OTHER PUBLICATIONS

Nsn et al., "PRACH Enhancement and Mechanism for Identifying Coverage Shortfall", 3GPP TSG RAN1#74bis, R1-134517, Agenda Item 7.2.2.2.2, Guangzhou, China, Oct. 7-11, 2013, 4 pages.
(Continued)

*Primary Examiner* — Jung H Park
(74) *Attorney, Agent, or Firm* — Slater Matsil, LLP

(57) ABSTRACT

Embodiments of the present invention provide an information transmission method, a user-side device, and a network-side device. The information transmission method provided in the embodiments includes sending, by the user-side device, a repetition factor to the network-side device, and sending, by the user-side device, a physical random access channel (PRACH) message part to the network-side device by using the repetition factor.

18 Claims, 12 Drawing Sheets

(56) References Cited

U.S. PATENT DOCUMENTS

| | | | | |
|---|---|---|---|---|
| 2015/0181533 A1* | 6/2015 | Chen | ................... | H04W 52/146 |
| | | | | 455/522 |
| 2015/0365977 A1* | 12/2015 | Tabet | ................. | H04J 13/0062 |
| | | | | 370/330 |
| 2016/0165640 A1* | 6/2016 | Yang | .................... | H04W 74/08 |
| | | | | 370/336 |
| 2017/0105127 A1* | 4/2017 | Xiong | .................... | H04W 4/70 |
| 2017/0181009 A1* | 6/2017 | Wong | ................... | H04W 16/26 |
| 2017/0280481 A1* | 9/2017 | Stern-Berkowitz | .......................... | |
| | | | | H04W 74/008 |

FOREIGN PATENT DOCUMENTS

| | | |
|---|---|---|
| CN | 103581959 A | 2/2014 |
| CN | 103916974 A | 7/2014 |
| WO | 2012148060 A1 | 11/2012 |

OTHER PUBLICATIONS

NTT DOCOMO, "Discussion on Multi-level PRACH Coverage Enhancement", 3GPP TSG RAN WG1 Meeting #74bis, R1-134493, Agenda Item 7.2.2.2.2, R1-134493, 5 pages.

ZTE, "Physical Random Access Channel Coverage Enhancement", 3GPP TSG RAN WG1 Meeting #74b, R1-134303, Agenda Item 7.2.2.2.2, Guangzhou, China, Oct. 7-11, 2013, 16 pages.

Intel Corporation, "Coverage Enhancement of PRACH for Low Cost MTC" 3GPP TSG RAN WG1 Meeting #75, R1-135104, San Francisco, USA, Nov. 11-15, 2013, Agenda Item 6.2.2.2.2, 8 pages.

\* cited by examiner

INFORMATION TRANSMISSION METHOD, USER-SIDE DEVICE, AND NETWORK-SIDE DEVICE

CROSS-REFERENCE TO RELATED APPLICATIONS

This application is a continuation of International Application No. PCT/CN2015/078215, filed on May 4, 2015, which claims priority to International Application No. PCT/CN2014/095676, filed on Dec. 30, 2014 and International Application No. PCT/CN2014/085932, filed on Sep. 4, 2014. All of the aforementioned patent applications are hereby incorporated by reference in their entireties.

TECHNICAL FIELD

Embodiments of the present invention relate to communications technologies, and in particular, to an information transmission method, a user-side device, and a network-side device.

BACKGROUND

Current wireless communications systems are mainly designed for user to user (H2H for short) communications. With the development of smart devices and wireless network communications technologies, many machine to machine (M2M for short) communications that do not require users to participate are increasingly developed, and become an indispensable part of daily life. The M2M communications may be applied in application scenarios such as telemetry, remote information processing, security and monitoring, public transport, industrial applications, remote meter reading, home applications, and sale and payment.

To improve coverage capabilities of corresponding M2M services in various application scenarios, a network-side device in the prior art uses a transmission time interval (TTI for short) bundling technology to respectively transmit, on multiple consecutive TTI resources, downlink information of one TTI to at least two user-side devices by using a same repetition factor, and the at least two user-side devices respectively combine the downlink information received on the multiple TTI resources to obtain complete downlink information. Correspondingly, the at least two user-side devices may respectively transmit, on multiple consecutive TTI resources, uplink information of one TTI to the network-side device by using a same repetition factor, and the network-side device combines the uplink information sent by each user-side device to obtain complete uplink information.

In the prior art, a coverage enhancement effect is achieved by combining gains. However, the inventor finds that resource waste is severe in the method used in the prior art.

SUMMARY

Embodiments of the present invention provide an information transmission method, a user-side device, and a network-side device to resolve a problem that resource waste is severe in the prior art.

According to a first aspect, an embodiment of the present invention provides an information transmission method, including sending, by a user-side device, a repetition factor to a network-side device and sending, by the user-side device, a physical random access channel a (PRACH) message part to the network-side device by using the repetition factor.

According to the first aspect, in a first possible implementation manner of the first aspect, before the sending, by a user-side device, a repetition factor to a network-side device, the method further includes: determining, by the user-side device, a coverage level of the user-side device; and querying, by the user-side device according to the coverage level, a correspondence between coverage level and repetition factor, and determining the repetition factor corresponding to the coverage level.

According to the first possible implementation manner of the first aspect, in a second possible implementation manner, the repetition factor includes an uplink repetition factor and a downlink repetition factor; the sending, by the user-side device, a PRACH message part to the network-side device by using the repetition factor includes: sending, by the user-side device, the PRACH message part to the network-side device by using the uplink repetition factor; and the sending, by a user-side device, a repetition factor to a network-side device includes: sending, by the user-side device, the uplink repetition factor and the downlink repetition factor to the network-side device, so that the network-side device receives, by using the uplink repetition factor, the PRACH message part sent by the user-side device, and sends, by using the downlink repetition factor, downlink information to the user-side device.

According to the second possible implementation manner of the first aspect, in a third possible implementation manner, the uplink repetition factor is the number of repetition times that the user-side device sends the PRACH message part, and the downlink repetition factor is the number of repetition times that the network-side device sends the downlink information.

According to any one of the first to third possible implementation manners of the first aspect, in a fourth possible implementation manner, the determining, by the user-side device, a coverage level of the user-side device includes: determining, by the user-side device, the coverage level according to a path loss level.

According to the fourth possible implementation manner of the first aspect, in a fifth possible implementation manner, before the determining, by the user-side device, the coverage level according to a path loss level, the method further includes: measuring, by the user-side device, a pilot channel sent by the network-side device, to obtain a receive power of the pilot channel; acquiring, by the user-side device, a transmit power of the pilot channel; determining, by the user-side device, a path loss according to the receive power of the pilot channel and the transmit power of the pilot channel; and determining, by the user-side device, the path loss level according to the path loss.

According to the fifth possible implementation manner of the first aspect, in a sixth possible implementation manner, the acquiring, by the user-side device, a transmit power of the pilot channel, includes: receiving, by the user-side device, the transmit power of the pilot channel that is sent by the network-side device by means of broadcast.

According to the fifth or sixth possible implementation manner of the first aspect, in a seventh possible implementation manner, the method further includes: acquiring, by the user-side device, an uplink interference power and a fixed compensating power; determining, by the user-side device, an initial transmit power of a PRACH preamble part according to the receive power of the pilot channel, the transmit power of the pilot channel, the uplink interference power, and the fixed compensating power; and sending, by the user-side device, the PRACH preamble part to the network-side device according to the initial transmit power by using the first number of sending times, where the first number of sending times is the initial number of times that the PRACH preamble part is sent.

According to the seventh possible implementation manner of the first aspect, in an eighth possible implementation manner, the acquiring, by the user-side device, an uplink interference power and a fixed compensating power includes: receiving, by the user-side device, the uplink interference power and the fixed compensating power that are sent by the network-side device by means of broadcast.

According to the seventh or eighth possible implementation manner of the first aspect, in a ninth possible implementation manner, the determining, by the user-side device, an initial transmit power of a PRACH preamble part according to the receive power of the pilot channel, the transmit power of the pilot channel, the uplink interference power, and the fixed compensating power includes: determining, by the user-side device according to the first number of sending times, a power parameter corresponding to the PRACH preamble part; and determining, by the user-side device, the initial transmit power according to the receive power of the pilot channel, the transmit power of the pilot channel, the uplink interference power, the fixed compensating power, and the power parameter corresponding to the PRACH preamble part.

According to any one of the seventh to ninth possible implementation manners of the first aspect, in a tenth possible implementation manner, the method further includes: receiving, by the user-side device, the second number of sending times that is sent by the network-side device through an acquisition indicator channel (AICH), where the second number of sending times is the number of times that the user-side device has sent the PRACH preamble part when the network-side device receives the PRACH preamble part; and when accessing the network-side device next time, sending, by the user-side device, a redetermined PRACH preamble part to the network-side device by using the second number of sending times.

Where the second number of sending times is the number of times that the user-side device has sent the PRACH preamble part when the network-side device receives the PRACH preamble part; and when accessing the network-side device next time, sending, by the user-side device, a redetermined PRACH preamble part to the network-side device by using the second number of sending times.

According to any one of the first to tenth possible implementation manners of the first aspect, in an eleventh possible implementation manner, the sending, by a user-side device, a repetition factor to a network-side device includes: adding, by the user-side device, the repetition factor to a control part in the PRACH message part, and sending the control part in the PRACH message part to the network-side device through a dedicated physical control channel (DPCCH); or adding, by the user-side device, the repetition factor to an enhanced dedicated physical control channel (E-DPCCH), and sending the E-DPCCH to the network-side device.

According to the first to eleventh possible implementation manners of the first aspect, in a twelfth possible implementation manner, the correspondence between coverage level and repetition factor includes a feature code range, corresponding to the coverage level, of the PRACH preamble part; and the sending, by a user-side device, a repetition factor to a network-side device includes: sending, by the user-side device, a feature code corresponding to the PRACH preamble part to the network-side device, so that the network-side device determines the repetition factor according to the feature code range to which the feature code corresponding to the PRACH preamble part belongs.

According to any one of the first to twelfth possible implementation manners of the first aspect, in a thirteenth possible implementation manner, before the querying, by the user-side device according to the coverage level, a correspondence between coverage level and repetition factor, and determining the repetition factor corresponding to the coverage level, the method further includes: receiving, by the user-side device, the correspondence between coverage level and repetition factor, where the correspondence between coverage level and repetition factor is sent by the network-side device by means of broadcast or dedicated signaling.

According to a second aspect, an embodiment of the present invention further provides an information transmission method, including receiving, by a network-side device, a repetition factor sent by a user-side device, where the repetition factor is a repetition factor corresponding to a coverage level and is determined by the user-side device by querying, according to the determined coverage level, a correspondence between coverage level and repetition factor. The method also includes receiving, by the network-side device, a PRACH message part that is sent by the user-side device by using the repetition factor.

According to the second aspect, in a first possible implementation manner of the second aspect, the repetition factor includes an uplink repetition factor and a downlink repetition factor; the receiving, by a network-side device, a repetition factor sent by a user-side device includes: receiving, by the network-side device, the uplink repetition factor and the downlink repetition factor that are sent by the user-side device; the receiving, by the network-side device, a PRACH message part that is sent by the user-side device by using the repetition factor includes: receiving, by the network-side device, the PRACH message part that is sent by the user-side device by using the uplink repetition factor; and the method further includes: sending, by the network-side device, downlink information to the user-side device by using the downlink repetition factor.

According to the first possible implementation manner of the second aspect, in a second possible implementation manner, the uplink repetition factor is the number of repetition times that the user-side device sends the PRACH message part, and the downlink repetition factor is the number of repetition times that the network-side device sends the downlink information.

According to any one of the second aspect to the second possible implementation manner of the second aspect, in a third possible implementation manner of the second aspect, before the receiving, by the network-side device, a PRACH message part that is sent by the user-side device by using the repetition factor, the method further includes: receiving, by the network-side device, a PRACH preamble part that is sent by the user-side device according to an initial transmit power by using the first number of sending times, where the initial transmit power is an initial transmit power of the PRACH preamble part and is determined by the user-side device according to a receive power of a pilot channel, a transmit power of the pilot channel, an uplink interference power, and a fixed compensating power, where the first number of sending times is the initial number of times that the PRACH preamble part is sent.

According to the third possible implementation manner of the second aspect, in a fourth possible implementation manner, before the receiving, by the network-side device, a PRACH preamble part that is sent by the user-side device according to an initial transmit power by using the first number of sending times, the method further includes: sending, by the network-side device, the transmit power of the pilot channel, the uplink interference power, and the fixed compensating power to the user-side device by means of broadcast.

According to the third or fourth possible implementation manner of the second aspect, in a fifth possible implementation manner, the initial transmit power is the initial transmit power of the PRACH preamble part and is determined by the user-side device according to the receive power of the pilot channel, the transmit power of the pilot channel, the uplink interference power, the fixed compensating power, and a power parameter corresponding to the PRACH preamble part, where the power parameter corresponding to the PRACH preamble part is a power parameter determined by the user-side device according to the first number of sending times.

According to any one of the second aspect to the fifth possible implementation manner of the second aspect, in a sixth possible implementation manner, the method further includes: sending, by the network-side device, the second number of sending times to the user-side device through an AICH, so that when the user-side device accesses the network-side device next time, the user-side device sends a redetermined PRACH preamble part to the network-side device by using the second number of sending times, where the second number of sending times is the number of times that the user-side device has sent the PRACH preamble part when the network-side device receives the PRACH preamble part.

According to any one of the second aspect to the sixth possible implementation manner of the second aspect, in a seventh possible implementation manner, the receiving, by a network-side device, a repetition factor sent by a user-side device includes: receiving, by the network-side device, the repetition factor carried in a control part in the PRACH message part that is sent by the user-side device through a DPCCH; or receiving, by the network-side device, the repetition factor carried in an E-DPCCH sent by the user-side device.

According to any one of the second aspect to the sixth possible implementation manner of the second aspect, in an eighth possible implementation manner, the receiving, by a network-side device, a repetition factor sent by a user-side device includes: receiving, by the network-side device, a feature code sent by the user-side device and corresponding to the PRACH preamble part; determining, by the network-side device according to the feature code corresponding to the PRACH preamble part, a feature code range to which the feature code corresponding to the PRACH preamble part belongs; and determining, by the network-side device, the repetition factor according to the feature code range to which the feature code corresponding to the PRACH preamble part belongs and the correspondence between coverage level and repetition factor, where the correspondence between coverage level and repetition factor includes the feature code range, corresponding to the coverage level, of the PRACH preamble part.

According to any one of the second aspect to the eighth possible implementation manner of the second aspect, in a ninth possible implementation manner, before the receiving, by a network-side device, a repetition factor sent by a user-side device, the method further includes: sending, by the network-side device, the correspondence between coverage level and repetition factor to the user-side device by means of broadcast or dedicated signaling.

According to a third aspect, an embodiment of the present invention further provides an information transmission method, including: determining, by a user-side device, a transport block quantity of a PRACH message part; sending, by the user-side device, the transport block quantity to a network-side device; and sending, by the user-side device, multiple transport blocks to the network-side device by using the transport block quantity.

According to the third aspect, in a first possible implementation manner of the third aspect, the determining, by a user-side device, a transport block quantity of a PRACH message part includes: determining, by the user-side device, the transport block quantity according to a size of the PRACH message part and a size of a single transport block.

According to the third aspect or the first possible implementation manner of the third aspect, in a second possible implementation manner, the sending, by the user-side device, the transport block quantity to a network-side device includes: adding, by the user-side device, the transport block quantity to a control part in the PRACH message part, and sending the control part in the PRACH message part to the network-side device through a DPCCH; or adding, by the user-side device, the transport block quantity to an E-DPCCH, and sending the E-DPCCH to the network-side device.

According to the third aspect or the first possible implementation manner of the third aspect, in a third possible implementation manner, the sending, by the user-side device, the transport block quantity to a network-side device includes: sending, by the user-side device, a feature code corresponding to a PRACH preamble part to the network-side device, so that the network-side device determines the transport block quantity according to a feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

According to a fourth aspect, an embodiment of the present invention further provides an information transmission method, including: receiving, by a network-side device, a transport block quantity sent by a user-side device, where the transport block quantity is a transport block quantity of a PRACH message part and is determined by the user-side device; receiving, by the network-side device, multiple transport blocks that are sent by the user-side device to the network-side device by using the transport block quantity; and determining, by the network-side device, the PRACH message part according to the transport block quantity and the multiple transport blocks.

According to the fourth aspect, in a first possible implementation manner of the fourth aspect, the receiving, by a network-side device, a transport block quantity sent by a user-side device includes: receiving, by the network-side device, the transport block quantity carried in a control part in the PRACH message part that is sent by the user-side device through a DPCCH; or receiving, by the network-side device, the transport block quantity carried in an E-DPCCH sent by the user-side device.

According to the fourth aspect, in a second possible implementation manner of the fourth aspect, the receiving, by a network-side device, a transport block quantity sent by a user-side device includes: receiving, by the network-side device, a feature code sent by the user-side device and corresponding to a PRACH preamble part; determining, by the network-side device according to the feature code corresponding to the PRACH preamble part, a feature code range to which the feature code corresponding to the PRACH preamble part belongs; and determining, by the network-side device, the transport block quantity according to the feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

According to a fifth aspect, an embodiment of the present invention further provides a user-side device, including: a sending module, configured to send a repetition factor to a network-side device, and send a PRACH message part to the network-side device by using the repetition factor.

According to the fifth aspect, in a first possible implementation manner of the fifth aspect, the user-side device further includes: a determining module, configured to: before the sending module sends the repetition factor to the network-side device, determine a coverage level of the user-side device, query, according to the coverage level, a correspondence between coverage level and repetition factor, and determine the repetition factor corresponding to the coverage level.

According to the first possible implementation manner of the fifth aspect, in a second possible implementation manner, the repetition factor includes an uplink repetition factor and a downlink repetition factor; and the sending module is further configured to send the PRACH message part to the network-side device by using the uplink repetition factor, and send the uplink repetition factor and the downlink repetition factor to the network-side device, so that the network-side device receives, by using the uplink repetition factor, the PRACH message part sent by the user-side device, and sends, by using the downlink repetition factor, downlink information to the user-side device.

According to the second possible implementation manner of the fifth aspect, in a third possible implementation manner, the uplink repetition factor is the number of repetition times that the user-side device sends the PRACH message part, and the downlink repetition factor is the number of repetition times that the network-side device sends the downlink information.

According to any one of the first to third possible implementation manners of the fifth aspect, in a fourth possible implementation manner, the determining module is further configured to determine the coverage level according to a path loss level.

According to the fourth possible implementation manner of the fifth aspect, in a fifth possible implementation manner, the determining module is further configured to measure a pilot channel sent by the network-side device, to obtain a receive power of the pilot channel; the user-side device further includes: an acquiring module, configured to acquire a transmit power of the pilot channel; and the determining module is further configured to determine a path loss according to the receive power of the pilot channel and the transmit power of the pilot channel, and determine the path loss level according to the path loss.

According to the fifth possible implementation manner of the fifth aspect, in a sixth possible implementation manner, the user-side device further includes: a first receiving module, configured to receive the transmit power of the pilot channel that is sent by the network-side device by means of broadcast.

According to the fifth or sixth possible implementation manner of the fifth aspect, in a seventh possible implementation manner, the acquiring module is further configured to acquire an uplink interference power and a fixed compensating power; the determining module is further configured to determine an initial transmit power of a PRACH preamble part according to the receive power of the pilot channel, the transmit power of the pilot channel, the uplink interference power, and the fixed compensating power; and the sending module is further configured to send the PRACH preamble part to the network-side device according to the initial transmit power by using the first number of sending times, where the first number of sending times is the initial number of times that the PRACH preamble part is sent.

According to the seventh possible implementation manner of the fifth aspect, in an eighth possible implementation manner, the user-side device further includes: a second receiving module, configured to receive the uplink interference power and the fixed compensating power that are sent by the network-side device by means of broadcast.

According to the seventh or eighth possible implementation manner of the fifth aspect, in a ninth possible implementation manner, the determining module is further configured to determine, according to the first number of sending times, a power parameter corresponding to the PRACH preamble part, and determine the initial transmit power according to the receive power of the pilot channel, the transmit power of the pilot channel, the uplink interference power, the fixed compensating power, and the power parameter corresponding to the PRACH preamble part.

According to any one of the seventh to ninth possible implementation manners of the fifth aspect, in a tenth possible implementation manner, the user-side device further includes: a third receiving module, configured to receive the second number of sending times that is sent by the network-side device through an AICH, where the second number of sending times is the number of times that the user-side device has sent the PRACH preamble part when the network-side device receives the PRACH preamble part; and the sending module is further configured to: at a next time of accessing the network-side device, send a redetermined PRACH preamble part to the network-side device by using the second number of sending times.

According to any one of the first to tenth possible implementation manners of the fifth aspect, in an eleventh possible implementation manner, the sending module is further configured to: add the repetition factor to a control part in the PRACH message part, and send the control part in the PRACH message part to the network-side device through a DPCCH; or configured to add the repetition factor to an E-DPCCH, and send the E-DPCCH to the network-side device.

According to any one of the first to eleventh possible implementation manners of the fifth aspect, in a twelfth possible implementation manner, the correspondence between coverage level and repetition factor includes a feature code range, corresponding to the coverage level, of the PRACH preamble part; and the sending module is further configured to send a feature code corresponding to the PRACH preamble part to the network-side device, so that the network-side device determines the repetition factor according to the feature code range to which the feature code corresponding to the PRACH preamble part belongs.

According to any one of the first to twelfth possible implementation manners of the fifth aspect, in a thirteenth possible implementation manner, the user-side device further includes: a fourth receiving module, configured to: before the determining module queries, according to the coverage level, the correspondence between coverage level and repetition factor, and determines the repetition factor corresponding to the coverage level, receive the correspondence between coverage level and repetition factor, where the correspondence between coverage level and repetition factor is sent by the network-side device by means of broadcast or dedicated signaling.

According to a sixth aspect, an embodiment of the present invention provides a network-side device, including: a receiving module, configured to receive a repetition factor sent by a user-side device, and receive a PRACH message part that is sent by the user-side device by using the repetition factor, where the repetition factor is a repetition factor corresponding to a coverage level and is determined by the user-side device by querying, according to the determined coverage level, a correspondence between coverage level and repetition factor.

According to the sixth aspect, in a first possible implementation manner of the sixth aspect, the repetition factor includes an uplink repetition factor and a downlink repetition factor; the receiving module is further configured to receive the uplink repetition factor and the downlink repetition factor that are sent by the user-side device, and receive the PRACH message part that is sent by the user-side device by using the uplink repetition factor; and the network-side device further includes: a first sending module, configured to send downlink information to the user-side device by using the downlink repetition factor.

According to the first possible implementation manner of the sixth aspect, in a second possible implementation manner, the uplink repetition factor is the number of repetition times that the user-side device sends the PRACH message part, and the downlink repetition factor is the number of repetition times that the network-side device sends the downlink information.

According to any one of the sixth aspect to the second possible implementation manner of the sixth aspect, in a third possible implementation manner, the receiving module is further configured to: before receiving the PRACH message part that is sent by the user-side device by using the repetition factor, receive a PRACH preamble part that is sent by the user-side device according to an initial transmit power by using the first number of sending times, where the initial transmit power is an initial transmit power of the PRACH preamble part and is determined by the user-side device according to a receive power of a pilot channel, a transmit power of the pilot channel, an uplink interference power, and a fixed compensating power, where the first number of sending times is the initial number of times that the PRACH preamble part is sent.

According to the third possible implementation manner of the sixth aspect, in a fourth possible implementation manner, the network-side device further includes: a second sending module, configured to: before the receiving module receives the PRACH preamble part that is sent according to the initial transmit power by using the first number of sending times, send the transmit power of the pilot channel, the uplink interference power, and the fixed compensating power to the user-side device by means of broadcast.

According to the third or fourth possible implementation manner of the sixth aspect, in a fifth possible implementation manner, the initial transmit power is the initial transmit power of the PRACH preamble part and is determined by the user-side device according to the receive power of the pilot channel, the transmit power of the pilot channel, the uplink interference power, the fixed compensating power, and a power parameter corresponding to the PRACH preamble part, where the power parameter corresponding to the PRACH preamble part is a power parameter determined by the user-side device according to the first number of sending times.

According to any one of the sixth aspect to the fifth possible implementation manner of the sixth aspect, in a sixth possible implementation manner, the network-side device further includes: a third sending module, configured to send the second number of sending times to the user-side device through an AICH, so that when the user-side device accesses the network-side device next time, the user-side device sends a redetermined PRACH preamble part to the network-side device by using the second number of sending times, where the second number of sending times is the number of times that the user-side device has sent the PRACH preamble part when the network-side device receives the PRACH preamble part.

According to any one of the sixth aspect to the sixth possible implementation manner of the sixth aspect, in a seventh possible implementation manner, the receiving module is further configured to: receive the repetition factor carried in a control part in the PRACH message part that is sent by the user-side device through a DPCCH; or configured to receive the repetition factor carried in an E-DPCCH sent by the user-side device.

According to any one of the sixth aspect to the sixth possible implementation manner of the sixth aspect, in an eighth possible implementation manner, the receiving module is further configured to receive a feature code sent by the user-side device and corresponding to the PRACH preamble part; and the network-side device further includes: a determining module, configured to determine, according to the feature code corresponding to the PRACH preamble part, a feature code range to which the feature code corresponding to the PRACH preamble part belongs, and determine the repetition factor according to the feature code range to which the feature code corresponding to the PRACH preamble part belongs and the correspondence between coverage level and repetition factor, where the correspondence between coverage level and repetition factor includes the feature code range, corresponding to the coverage level, of the PRACH preamble part.

According to any one of the sixth aspect to the eighth possible implementation manner of the sixth aspect, in a ninth possible implementation manner, the network-side device further includes: a fourth sending module, further configured to: before the receiving module receives the repetition factor sent by the user-side device, send the correspondence between coverage level and repetition factor to the user-side device by means of broadcast or dedicated signaling.

According to a seventh aspect, an embodiment of the present invention further provides a user-side device, including: a determining module, configured to determine a transport block quantity of a PRACH message part; and a sending module, configured to send the transport block quantity to a network-side device, and send multiple transport blocks to the network-side device by using the transport block quantity.

According to the seventh aspect, in a first possible implementation manner of the seventh aspect, the determining module is further configured to determine the transport block quantity according to a size of the PRACH message part and a size of a single transport block.

According to the seventh aspect or the first possible implementation manner of the seventh aspect, in a second possible implementation manner, the sending module is further configured to: add the transport block quantity to a control part in the PRACH message part, and send the control part in the PRACH message part to the network-side device through a DPCCH; or add the transport block quantity to an E-DPCCH, and send the E-DPCCH to the network-side device.

According to the seventh aspect or the first possible implementation manner of the seventh aspect, in a second possible implementation manner, the sending module is further configured to send a feature code corresponding to a PRACH preamble part to the network-side device, so that the network-side device determines the transport block quantity according to a feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

According to an eighth aspect, an embodiment of the present invention further provides a network-side device, including: a receiving module, configured to receive a transport block quantity sent by a user-side device, and receive multiple transport blocks that are sent by the user-side device to the network-side device by using the transport block quantity, where the transport block quantity is a transport block quantity of a PRACH message part and is determined by the user-side device; and a determining module, configured to determine the PRACH message part according to the transport block quantity and the multiple transport blocks.

According to the eighth aspect, in a first possible implementation manner of the eighth aspect, the receiving module is further configured to: receive the transport block quantity carried in a control part in the PRACH message part that is sent by the user-side device through a DPCCH; or receive the transport block quantity carried in an E-DPCCH sent by the user-side device.

According to the eighth aspect, in a second possible implementation manner of the eighth aspect, the receiving module is further configured to receive a feature code sent by the user-side device and corresponding to a PRACH preamble part; and the determining module is further configured to determine, according to the feature code corresponding to the PRACH preamble part, a feature code range to which the feature code corresponding to the PRACH preamble part belongs, and determine the transport block quantity according to the feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

According to a ninth aspect, an embodiment of the present invention further provides a user-side device, including a receiver, a processor, and a transmitter, where: the transmitter is configured to send a repetition factor to a network-side device, and send a PRACH message part to the network-side device by using the repetition factor.

According to the ninth aspect, in a first possible implementation manner of the ninth aspect, the processor is configured to determine a coverage level of the user-side device, query, according to the coverage level, a correspondence between coverage level and repetition factor, and determine the repetition factor corresponding to the coverage level.

According to the first possible implementation manner of the ninth aspect, in a second possible implementation manner, the repetition factor includes an uplink repetition factor and a downlink repetition factor; and the transmitter is further configured to send the PRACH message part to the network-side device by using the uplink repetition factor, and send the uplink repetition factor and the downlink repetition factor to the network-side device, so that the network-side device receives, by using the uplink repetition factor, the PRACH message part sent by the user-side device, and sends, by using the downlink repetition factor, downlink information to the user-side device.

According to the second possible implementation manner of the ninth aspect, in a third possible implementation manner, the uplink repetition factor is the number of repetition times that the user-side device sends the PRACH message part, and the downlink repetition factor is the number of repetition times that the network-side device sends the downlink information.

According to any one of the first to third possible implementation manners of the ninth aspect, in a fourth possible implementation manner, the processor is further configured to determine the coverage level according to a path loss level.

According to the fourth possible implementation manner of the ninth aspect, in a fifth possible implementation manner, the processor is further configured to measure a pilot channel sent by the network-side device, to obtain a receive power of the pilot channel, acquire a transmit power of the pilot channel, determine a path loss according to the receive power of the pilot channel and the transmit power of the pilot channel, and determine the path loss level according to the path loss.

According to the fifth possible implementation manner of the ninth aspect, in a sixth possible implementation manner, the receiver is configured to receive the transmit power of the pilot channel that is sent by the network-side device by means of broadcast.

According to the fifth or sixth possible implementation manner of the ninth aspect, in a seventh possible implementation manner, the processor is further configured to acquire an uplink interference power and a fixed compensating power, determine an initial transmit power of a PRACH preamble part according to the receive power of the pilot channel, the transmit power of the pilot channel, the uplink interference power, and the fixed compensating power, and send the PRACH preamble part to the network-side device according to the initial transmit power by using the first number of sending times, where the first number of sending times is the initial number of times that the PRACH preamble part is sent.

According to the seventh possible implementation manner of the ninth aspect, in an eighth possible implementation manner, the receiver is further configured to receive the uplink interference power and the fixed compensating power that are sent by the network-side device by means of broadcast.

According to the seventh or eighth possible implementation manner of the ninth aspect, in a ninth possible implementation manner, the processor is further configured to determine, according to the first number of sending times, a power parameter corresponding to the PRACH preamble part, and determine the initial transmit power according to the receive power of the pilot channel, the transmit power of the pilot channel, the uplink interference power, the fixed compensating power, and the power parameter corresponding to the PRACH preamble part.

According to any one of the seventh to ninth possible implementation manners of the ninth aspect, in a tenth possible implementation manner, the receiver is further configured to receive the second number of sending times that is sent by the network-side device through an AICH, where the second number of sending times is the number of times that the user-side device has sent the PRACH preamble part when the network-side device receives the PRACH preamble part; and the transmitter is further configured to: at a next time of accessing the network-side device, send a redetermined PRACH preamble part to the network-side device by using the second number of sending times.

According to any one of the first to tenth possible implementation manners of the ninth aspect, in an eleventh possible implementation manner, the transmitter is further configured to: add the repetition factor to a control part in the PRACH message part, and send the control part in the PRACH message part to the network-side device through a DPCCH; or configured to add the repetition factor to an E-DPCCH, and send the E-DPCCH to the network-side device.

According to any one of the first to eleventh possible implementation manners of the ninth aspect, in a twelfth possible implementation manner, the correspondence between coverage level and repetition factor further includes a feature code range, corresponding to the coverage level, of the PRACH preamble part; and the transmitter is further configured to send a feature code corresponding to the PRACH preamble part to the network-side device, so that the network-side device determines the repetition factor according to the feature code range to which the feature code corresponding to the PRACH preamble part belongs.

According to any one of the first to twelfth possible implementation manners of the ninth aspect, in a thirteenth possible implementation manner, the receiver is further configured to receive the correspondence between coverage level and repetition factor, where the correspondence between coverage level and repetition factor is sent by the network-side device by means of broadcast or dedicated signaling.

According to a tenth aspect, an embodiment of the present invention further provides a network-side device, including a receiver, a processor, and a transmitter, where:

the receiver is configured to receive a repetition factor sent by a user-side device, and receive a PRACH message part that is sent by the user-side device by using the repetition factor, where the repetition factor is a repetition factor corresponding to a coverage level and is determined by the user-side device by querying, according to the determined coverage level, a correspondence between coverage level and repetition factor.

According to the tenth aspect, in a first possible implementation manner of the tenth aspect, the repetition factor includes an uplink repetition factor and a downlink repetition factor; the receiver is further configured to receive the uplink repetition factor and the downlink repetition factor that are sent by the user-side device, and receive the uplink repetition factor and the downlink repetition factor that are sent by the user-side device; and the transmitter is configured to send downlink information to the user-side device by using the downlink repetition factor.

According to the first possible implementation manner of the tenth aspect, in a second possible implementation manner, the uplink repetition factor is the number of repetition times that the user-side device sends the PRACH message part, and the downlink repetition factor is the number of repetition times that the network-side device sends the downlink information.

According to any one of the tenth aspect to the second possible implementation manner of the tenth aspect, in a third possible implementation manner, the receiver is further configured to: before receiving the PRACH message part that is sent by the user-side device by using the repetition factor, receive a PRACH preamble part that is sent by the user-side device according to an initial transmit power by using the first number of sending times, where the initial transmit power is an initial transmit power of the PRACH preamble part and is determined by the user-side device according to a receive power of a pilot channel, a transmit power of the pilot channel, an uplink interference power, and a fixed compensating power, where the first number of sending times is the initial number of times that the PRACH preamble part is sent.

According to the third possible implementation manner of the tenth aspect, in a fourth possible implementation manner, the transmitter is further configured to: before the receiver receives the PRACH preamble part that is sent by the user-side device according to the initial transmit power by using the first number of sending times, send the transmit power of the pilot channel, the uplink interference power, and the fixed compensating power to the user-side device by means of broadcast.

According to the third or fourth possible implementation manner of the tenth aspect, in a fifth possible implementation manner, the initial transmit power is the initial transmit power of the PRACH preamble part and is determined by the user-side device according to the receive power of the pilot channel, the transmit power of the pilot channel, the uplink interference power, the fixed compensating power, and a power parameter corresponding to the PRACH preamble part, where the power parameter corresponding to the PRACH preamble part is a power parameter determined by the user-side device according to the first number of sending times.

According to any one of the tenth aspect to the fifth possible implementation manner of the tenth aspect, in a sixth possible implementation manner, the transmitter is further configured to send the second number of sending times to the user-side device through an AICH, so that when the user-side device accesses the network-side device next time, the user-side device sends a redetermined PRACH preamble part to the network-side device by using the second number of sending times, where the second number of sending times is the number of times that the user-side device has sent the PRACH preamble part when the network-side device receives the PRACH preamble part.

According to any one of the tenth aspect to the sixth possible implementation manner of the tenth aspect, in a seventh possible implementation manner, the receiver is further configured to: receive the repetition factor carried in a control part in the PRACH message part that is sent by the user-side device through a DPCCH; or configured to receive the repetition factor carried in an E-DPCCH sent by the user-side device.

According to any one of the tenth aspect to the seventh possible implementation manner of the tenth aspect, in an eighth possible implementation manner, the receiver is further configured to receive a feature code sent by the user-side device and corresponding to the PRACH preamble part; and the processor is further configured to determine, according to the feature code corresponding to the PRACH preamble part, a feature code range to which the feature code corresponding to the PRACH preamble part belongs, and determine the repetition factor according to the feature code range to which the feature code corresponding to the PRACH preamble part belongs and the correspondence between coverage level and repetition factor, where the correspondence between coverage level and repetition factor includes the feature code range, corresponding to the coverage level, of the PRACH preamble part.

According to any one of the tenth aspect to the seventh possible implementation manner of the tenth aspect, in an eighth possible implementation manner, the transmitter is further configured to: before the receiver receives the repetition factor sent by the user-side device, send the correspondence between coverage level and repetition factor to the user-side device by means of broadcast or dedicated signaling.

According to an eleventh aspect, an embodiment of the present invention further provides a user-side device, including a receiver, a processor, and a transmitter, where: the processor is configured to determine a transport block quantity of a PRACH message part; and the transmitter is configured to send the transport block quantity to a network-side device, and send multiple transport blocks to the network-side device by using the transport block quantity.

According to the eleventh aspect, in a first possible implementation manner of the eleventh aspect, the processor is further configured to determine the transport block quantity according to a size of the PRACH message part and a size of a single transport block.

According to the eleventh aspect or the first possible implementation manner of the eleventh aspect, in a second possible implementation manner, the transmitter is further configured to: add the transport block quantity to a control part in the PRACH message part, and send the control part in the PRACH message part to the network-side device through a DPCCH; or add the transport block quantity to an E-DPCCH, and send the E-DPCCH to the network-side device.

According to the eleventh aspect or the first possible implementation manner of the eleventh aspect, in a third possible implementation manner, the transmitter is further configured to send a feature code corresponding to a PRACH preamble part to the network-side device, so that the network-side device determines the transport block quantity according to a feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

According to a twelfth aspect, an embodiment of the present invention further provides a network-side device, including a receiver, a processor, and a transmitter, where: the receiver is configured to receive a transport block quantity sent by a user-side device, and receive multiple transport blocks that are sent by the user-side device to the network-side device by using the transport block quantity, where the transport block quantity is a transport block quantity of a PRACH message part and is determined by the user-side device; and the processor is configured to determine the PRACH message part according to the transport block quantity and the multiple transport blocks.

According to the twelfth aspect, in a first possible implementation manner of the twelfth aspect, the receiver is further configured to: receive the transport block quantity carried in a control part in the PRACH message part that is sent by the user-side device through a DPCCH; or receive the transport block quantity carried in an E-DPCCH sent by the user-side device.

According to the twelfth aspect, in a second possible implementation manner of the twelfth aspect, the receiver is further configured to receive a feature code sent by the user-side device and corresponding to a PRACH preamble part; and the processor is further configured to determine, according to the feature code corresponding to the PRACH preamble part, a feature code range to which the feature code corresponding to the PRACH preamble part belongs, and determine the transport block quantity according to the feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

In the information transmission method, user-side device, and network-side device in the embodiments of the present invention, the user-side device sends a repetition factor to the network-side device, and sends a PRACH message part to the network-side device by using the repetition factor, so that different user-side devices respectively use their own repetition factors to send the PRACH message part to reduce resource waste, and thereby unnecessary resource waste is reduced.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present embodiments.

The solution of each embodiment of the present invention is applicable to third-generation or more advanced mobile communications systems. A Universal Mobile Telecommunications System (UMTS for short) is one of main technical standards established by the 3rd Generation Partnership Project (3G for short), an international standardization organization, for the third-generation mobile communications system. As one of mainstream technologies for the third-generation mobile communications system, Wideband Code Division Multiple Access (WCDMA for short) is mainly applied in releases earlier than UMTS Release 5 (R5 for short). In R5, a High Speed Downlink Packet Access (HSDPA for short) technology is introduced to increase a downlink data transmission speed and reduce a user data transmission delay, so that a user has better experience in a UMTS network. In Release 6 (R6 for short), a High Speed Uplink Packet Access (HSUPA for short) technology is introduced, and an enhanced uplink dedicated channel (E-DCH for short) and a related physical channel are added to implement high-speed uplink data transmission and reduce an uplink data transmission delay. In R6, data transmitted by a user-side device may be transmitted in two states: CELL_FACH and CELL_DCH. If the user-side device is in the CELL_FACH state and the user-side device has a small amount of data to transmit, uplink information is transmitted on a random access channel (RACH for short), but a data rate of the RACH is low. If the user-side device is in the CELL_DCH state, uplink information is transmitted on an E-DCH channel. In Release-8, an enhanced CELL_FACH state of the user-side device is introduced. If the user-side device is in the enhanced CELL_FACH state, all uplink data information is transmitted by using a same E-DCH, which is similar to transmission in the CELL_DCH state. In each solution of the embodiments of the present invention, the user-side device performs transmission by using an RACH carried in a physical random access channel (PRACH for short), or performs transmission by using an E-DCH carried in a PRACH.

Figure 1:
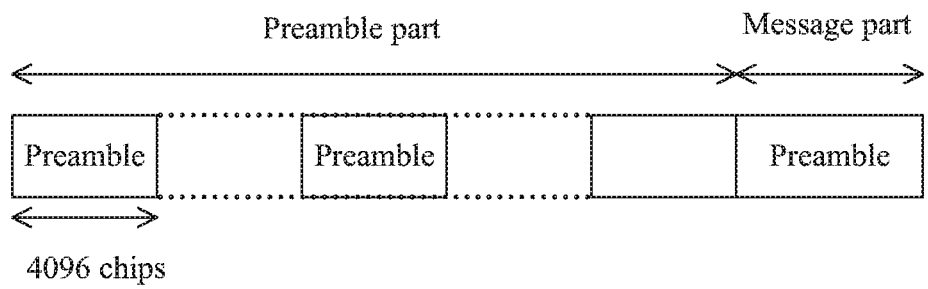
FIG. 1 is a schematic structural diagram of a frame of a physical random access channel a (PRACH)

FIG. 1 is a schematic structural diagram of a frame of a PRACH. As shown in FIG. 1, the PRACH includes a preamble part and a message part. The PRACH preamble part includes one or more preambles with a length of 4096 chips. The PRACH message part includes one radio frame or two radio frames. If the PRACH message part includes one radio frame, a length of the PRACH message part is 10 ms. If the PRACH message part includes two radio frames, a length of the PRACH message part is toms. If the user-side device is in the enhanced CELL_FACH state or the CELL_DCH state, the PRACH message part is carried in an E-DCH. If the user-side device is in the CELL_FACH state, the PRACH message part may be transmitted through an RACH. Each preamble in the PRACH preamble part in FIG. 1 may be a result of repeating a feature code with a length of 16 chips for 256 times. If a current network system has 16 different feature codes, a feature code in the PRACH preamble part may be a feature code that is randomly selected by the user-side device from the 16 different feature codes in a process of randomly accessing a network-side device.

Embodiment 1

Figure 2:
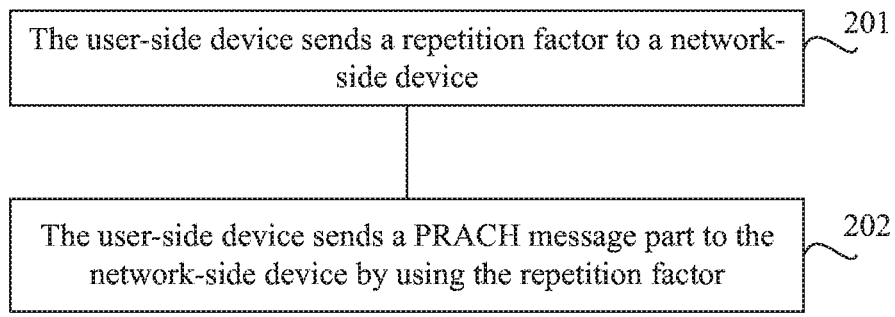
FIG. 2 is a flowchart of an information transmission method according to Embodiment 1 of the present invention.

FIG. 2 is a flowchart of an information transmission method according to Embodiment 1 of the present invention. Optionally, the method in this embodiment is applicable to a case in which at least two user-side devices access a network-side device in an M2M service application scenario. The method is performed by a user-side device. As shown in FIG. 2, the method in this embodiment includes the following steps.

Step 201: The user-side device sends a repetition factor to a network-side device.

Optionally, the user-side device may send the repetition factor to the network-side device according to different statuses of the user-side device by using different manners. The repetition factor may be a repetition factor corresponding to the user-side device. Different user-side devices may have repetition factors corresponding to the user-side devices.

Step 202: The user-side device sends a PRACH message part to the network-side device by using the repetition factor.

Optionally, the PRACH message part may include one radio frame, or may include two radio frames. Whether the PRACH message part specifically includes one or two radio frames may be configured in advance by a higher layer.

The user-side device sends the PRACH message part to the network-side device by using the repetition factor of the user-side device. If a network system includes at least two user-side devices, the at least two user-side devices in the network system may respectively send the PRACH message part to the network-side device according to repetition factors of the user-side devices. That is, each user-side device sends the PRACH message part by using a repetition factor, and not all the user-side devices use a same repetition factor. Therefore, a resource used by each user-side device may adapt to the user-side device, and thereby resource waste is avoided.

In the information transmission method provided by Embodiment 1 of the present invention, a user-side device sends a repetition factor to a network-side device, and sends a PRACH message part to the network-side device by using the repetition factor, so that different user-side devices send the PRACH message part by using their own repetition factors, and thereby resource waste is reduced.

It should be noted that, in the information transmission method provided by Embodiment 1 of the present invention, the user-side device further sends the repetition factor to the network-side device, so that the network-side device can learn the repetition factor of the user-side device, and thereby the network-side device can detect, according to the repetition factor, data, such as the PRACH message part, sent by the user-side device. This avoids a detection error caused by blind detection by the network-side device, and ensures that the network-side device accurately acquires the PRACH message part sent by the user-side device.

Embodiment 2

Figure 3:
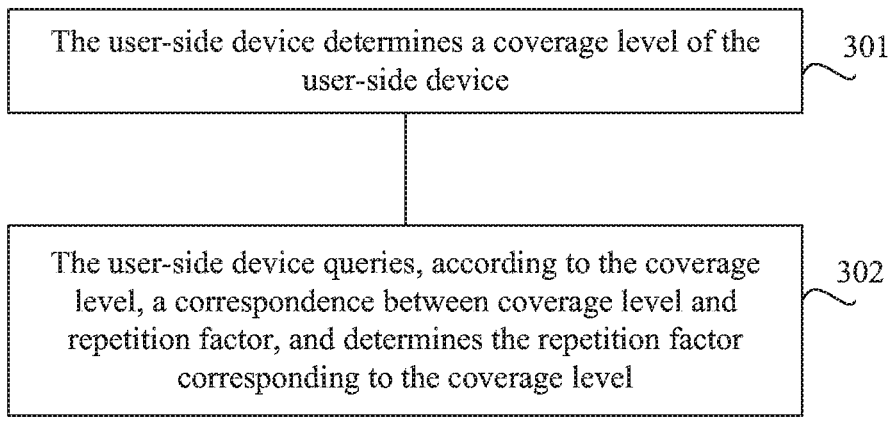
FIG. 3 is a flowchart of an information transmission method according to Embodiment 2 of the present invention.

Embodiment 2 of the present invention further provides an information transmission method. FIG. 3 is a flowchart of an information transmission method according to Embodiment 2 of the present invention. As shown in FIG. 3, before the user-side device sends the repetition factor to the network-side device in step 201 in the information transmission method in the foregoing Embodiment 1, the method may further include.

Step 301: The user-side device determines a coverage level of the user-side device.

Specifically, the user-side device may determine, according to a path loss level, a pilot receive level, or a pilot signal-to-noise ratio level of the user-side device, location information of the user-side device, or the like, the coverage level corresponding to the user-side device. Optionally, the location information of the user-side device may be geographic location information, where the geographic location information may include a distance between the user-side device and the network-side device, and/or an obstacle on a transmission path between the user-side device and the network-side device, and the like.

Step 302: The user-side device queries, according to the coverage level, a correspondence between coverage level and repetition factor, and determines the repetition factor corresponding to the coverage level.

Optionally, the repetition factor may be the number of repetition times, or may be indication information corresponding to the number of repetition times, for example, a feature code corresponding to a PRACH preamble part.

If the coverage level of the user-side device is lower, that is, if a coverage condition is worse, the number of repetition times represented or the number of repetition times indicated by the repetition factor is greater. Correspondingly, if the coverage level of the user-side device is higher, that is, if a coverage condition is better, the number of repetition times represented or the number of repetition times indicated by the repetition factor is smaller.

Optionally, if the user-side device determines the coverage level of the user-side device according to the path loss level of the user-side device, the correspondence between coverage level and repetition factor may be a correspondence between path loss level and repetition factor. The path loss level may be represented by a power value corresponding to a path loss, or may be represented by a power value range to which a path loss belongs. If the path loss level is represented by the power value range to which the path loss belongs, different path losses in the power value range to which the path loss belongs all belong to a same path loss level.

In the correspondence between path loss level and repetition factor, the higher the path loss level is, the worse the coverage will be, and the greater the number of repetition times represented or the number of repetition times indicated by the repetition factor will be; the lower the path loss level is, the better the coverage will be, and the smaller the number of repetition times represented or the number of repetition times indicated by the repetition factor will be.

For example, in the current network system, if the repetition factor is the number of times, the path loss between the user-side device and the network-side device may include four different path loss levels. The correspondence between path loss level and repetition factor may be, for example, shown in Table 1.

TABLE 1

| Path loss level | Repetition factor |
|---|---|
| 1 | 4 |
| 2 | 8 |
| 3 | 16 |
| 4 | 100 |

In the correspondence between path loss level and repetition factor as shown in Table 1, a repetition factor corresponding to the first path loss level is 4, a repetition factor corresponding to the second path loss level is 8, a repetition factor corresponding to the third path loss level is 16, and a repetition factor corresponding to the fourth path loss level is 100.

In this embodiment, if the path loss level determined by the user-side device is the first path loss level, the correspondence between path loss level and repetition factor may be queried by using the first path loss level, and the repetition factor corresponding to the first path loss level as shown in the Table 1 is obtained, for example, the repetition factor is 4 times.

Optionally, if the user-side device determines the coverage level of the user-side device according to the pilot receive level of the user-side device, the correspondence between coverage level and repetition factor may be a correspondence between pilot receive level and repetition factor. The pilot receive level may be represented by a received pilot power value that is measured by the user-side device, or may be represented by a range of a received pilot power value that is measured. If the pilot receive level is represented by the power value range to which the pilot power value belongs, different pilot power values in the power value range all belong to a same pilot receive level.

In the correspondence between pilot receive level and repetition factor, the lower the pilot receive level is, the worse the coverage will be, and the greater the number of repetition times represented or the number of repetition times indicated by the repetition factor will be; the higher the pilot receive level is, the better the coverage will be, and the smaller the number of repetition times represented or the number of repetition times indicated by the repetition factor will be.

For example, in the current network system, if the repetition factor is the number of times, a received pilot receive power obtained by the user-side device by means of measurement includes four different pilot receive levels. The correspondence between pilot receive level and repetition factor may be, for example, shown in Table 2.

TABLE 2

| Pilot receive level | Repetition factor |
|---|---|
| 1 | 100 |
| 2 | 16 |
| 3 | 8 |
| 4 | 4 |

In the correspondence between pilot receive level and repetition factor as shown in Table 2, a repetition factor corresponding to the first pilot receive level is 100, a repetition factor corresponding to the second pilot receive level is 16, a repetition factor corresponding to the third pilot receive level is 8, and a repetition factor corresponding to the fourth pilot receive level is 4. If the pilot receive level of the user-side device is the first pilot receive level, the correspondence between pilot receive level and repetition factor may be queried by using the first pilot receive level, and the repetition factor corresponding to the first pilot receive level as shown in the Table 2 is obtained, for example, the repetition factor is 100 times.

Optionally, if the user-side device determines the coverage level of the user-side device according to a pilot signal-to-noise ratio of the user-side device, the correspondence between coverage level and repetition factor may be a correspondence between pilot signal-to-noise ratio level and repetition factor. The pilot signal-to-noise ratio level may be represented by a pilot signal-to-noise ratio, or may be represented by a pilot signal-to-noise ratio range. If the pilot signal-to-noise ratio level is represented by the pilot signal-to-noise ratio range to which the pilot signal-to-noise ratio belongs, different pilot signal-to-noise ratios in the pilot signal-to-noise ratio range all belong to a same pilot signal-to-noise ratio level.

In the correspondence between pilot signal-to-noise ratio level and repetition factor, the higher the pilot signal-to-noise ratio level is, the better the coverage will be, and the smaller the number of repetition times represented or the number of repetition times indicated by the repetition factor will be; the lower the pilot signal-to-noise ratio level is, the worse the coverage will be, and the greater the number of repetition times represented or the number of repetition times indicated by the repetition factor will be.

For example, in the current network system, if the repetition factor is the number of times, the pilot signal-to-noise ratio of the user-side device includes four different pilot signal-to-noise ratio levels. The correspondence between pilot signal-to-noise ratio level and repetition factor may be, for example, shown in Table 3.

TABLE 3

| Pilot signal-to-noise ratio level | Repetition factor |
|---|---|
| 1 | 100 |
| 2 | 16 |
| 3 | 8 |
| 4 | 4 |

In the correspondence between pilot signal-to-noise ratio level and repetition factor as shown in Table 3, a repetition factor corresponding to the first pilot signal-to-noise ratio level is 100, a repetition factor corresponding to the second pilot signal-to-noise ratio level is 16, a repetition factor corresponding to the third pilot signal-to-noise ratio level is 8, and a repetition factor corresponding to the fourth pilot signal-to-noise ratio level is 4. If the pilot signal-to-noise ratio level determined by the user-side device is the first pilot signal-to-noise ratio level, the correspondence between pilot signal-to-noise ratio level and repetition factor may be queried by using the first pilot signal-to-noise ratio level, and the repetition factor corresponding to the first pilot signal-to-noise ratio level as shown in the Table 3 is obtained, for example, the repetition factor is 100 times.

It should be noted that, in the table of the correspondence between path loss level and repetition factor as shown in Table 1, a specific value of the number of times represented by a repetition factor corresponding to each path loss level may also be another value, and that the repetition factor corresponding to each path loss level may also be represented by other information, for example, represented by indication information such as the feature code of the PRACH preamble part. The embodiment of the present invention is not limited thereto. Settings of values in Table 2 and Table 3 are similar to those in Table 1, and are not further described herein.

A repetition factor of a user-side device is determined according to a coverage level of the user-side device, so that the repetition factor of the user-side device can adapt to the coverage level. Thereby, a repetition factor of a user-side device at a lower coverage level is greater, and service coverage is improved; a repetition factor of a user-side device at a higher coverage level is smaller, interference from a cell is reduced, and resource waste is reduced.

In the information transmission method provided by the embodiment of the present invention, a user-side device determines a coverage level of the user-side device, and determines a repetition factor of the user-side device according to the coverage level. Thereby, resources used by a user-side device at a higher coverage level are reduced, and resource waste is avoided.

Embodiment 3

Figure 4:
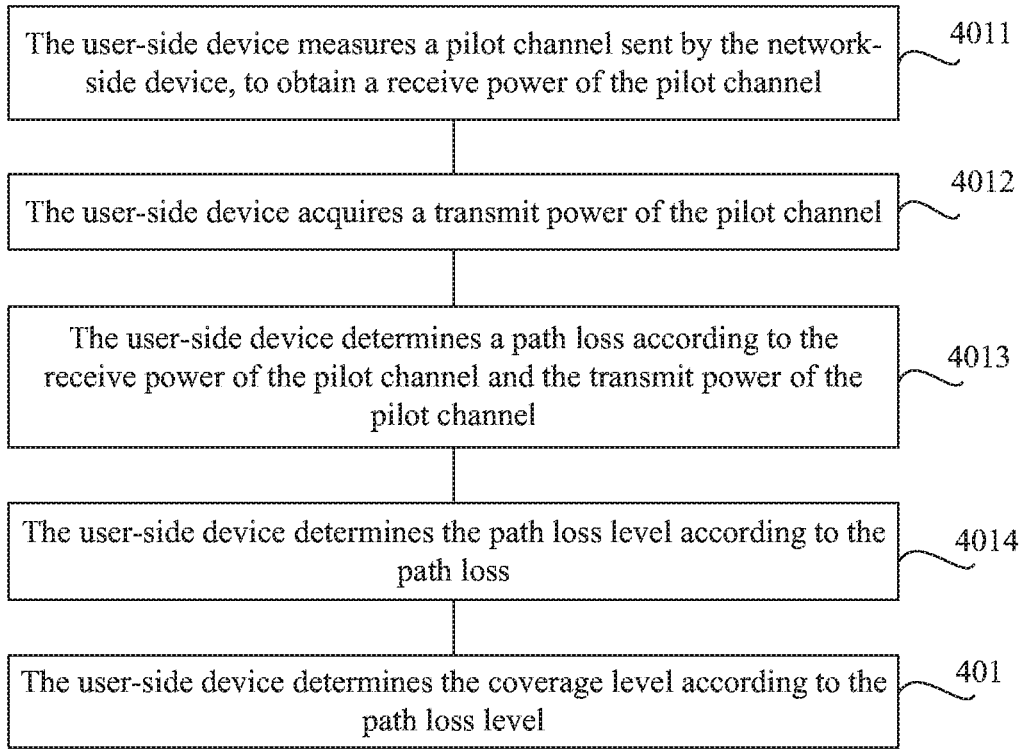
FIG. 4 is a flowchart of an information transmission method according to Embodiment 3 of the present invention.

FIG. 4 is a flowchart of an information transmission method according to Embodiment 3 of the present invention. Embodiment 3 of the present invention further provides an information transmission method. On a basis of the solution of the foregoing Embodiment 1 or 2, the repetition factor includes an uplink repetition factor and a downlink repetition factor.

Optionally, the uplink repetition factor is the number of repetition times that the user-side device sends the PRACH message part. On a basis of the information transmission method in the foregoing Embodiment 2, that the user-side device sends a PRACH message part to the network-side device by using the repetition factor in step 202 may include:

the user-side device sends the PRACH message part to the network-side device by using the uplink repetition factor.

Correspondingly, that the user-side device sends a repetition factor to a network-side device in step 201 may include: the user-side device sends the uplink repetition factor and the downlink repetition factor to the network-side device, so that the network-side device receives, by using the uplink repetition factor, the PRACH message part sent by the user-side device, and sends, by using the downlink repetition factor, downlink information to the user-side device.

Specifically, in the solution of the foregoing embodiment, the uplink repetition factor is the number of repetition times that the user-side device sends uplink information, that is, the uplink repetition factor may be represented by the number of repetition times required for transmitting uplink information. The uplink information may include uplink data information transmitted through an uplink data channel and uplink control information transmitted through an uplink control channel. Therefore, the uplink repetition factor may include the number of repetition times that the uplink data information is transmitted through the uplink data channel and the number of repetition times that the uplink control information is transmitted through the uplink control channel. The uplink data information may be data information in the PRACH message part. The data information in the PRACH message part may be transmitted through different transmission channels according to different statuses of the user-side device that accesses the network-side device. The number of repetition times of the uplink data information and the number of repetition times of the uplink control information may be the same, or may be different.

For example, if the user-side device is in the CELL_FACH state, the user-side device may transmit the data information in the PRACH message part through a dedicated physical data channel (DPDCH for short). If the user-side device is in the enhanced CELL_FACH state, the user-side device may transmit the data information in the PRACH message part through an enhanced dedicated physical data channel (E-DPDCH for short). The uplink control information may be control information in the PRACH message part. The control information in the PRACH message part may be transmitted through different transmission channels according to different statuses of the user-side device that accesses the network-side device.

If the user-side device is in the CELL_FACH state, the user-side device may transmit the control information in the PRACH message part through a dedicated physical control channel (DPCCH for short). If the user-side device is in the enhanced CELL_FACH state, the user-side device may transmit the control information in the PRACH message part through a DPCCH or an enhanced dedicated physical control channel (E-DPCCH for short).

The downlink repetition factor is the number of repetition times that the network-side device sends the downlink information, that is, the downlink repetition factor may represent the number of repetition times required for transmitting the downlink information. The downlink information may be information of a downlink common channel and information of a downlink dedicated channel. Therefore, the downlink repetition factor includes the number of repetition times of the downlink common channel and the number of repetition times of the downlink dedicated channel. The downlink common channel may be an acquisition indicator channel (AICH for short) or an E-DCH absolute grant channel (E-AGCH for short). The downlink dedicated channel may be a fractional dedicated physical channel (F-DPCH for short), or an E-DCH hybrid automatic repeat request indicator channel (E-HICH for short), or an E-DCH relative grant channel (E-RGCH).

Because the user-side device further sends the uplink repetition factor and the downlink repetition factor to the network-side device, the network-side device can receive, by using the uplink repetition factor, the PRACH message part sent by the user-side device, and the network-side device can send, by using the downlink repetition factor, the downlink information to the user-side device. Thereby, resources used by a user-side device with a lower path loss for sending the PRACH message part to the network-side device and receiving downlink information sent by the network-side device can be reduced, and resource waste is reduced. In addition, the network-side device can acquire the uplink repetition factor and the downlink repetition factor, and thereby a detection error caused by blind detection by the network-side device can be avoided.

That the user-side device determines a coverage level of the user-side device in step 301 may include.

Step 401: The user-side device determines the coverage level according to a path loss level.

Optionally, before the user-side device determines the coverage level according to the path loss level in step 401, the method may include.

Step 4011: The user-side device measures a pilot channel sent by the network-side device, to obtain a receive power of the pilot channel.

Optionally, the receive power of the pilot channel is a received signal code power (RSCP for short) of the pilot channel received by the user-side device. The user-side device may determine the receive power of the pilot channel by measuring a level value corresponding to the received pilot channel. The pilot channel may be a common pilot channel (CPICH for short), and therefore, the receive power of the pilot channel may be represented by CPICH_RSCP.

Step 4012: The user-side device acquires a transmit power of the pilot channel.

Optionally, the transmit power of the pilot channel may be a preset power value that is configured according to a service coverage condition in the current network system, or may be determined according to a preset transmit power allocation scheme, or may be sent by the network-side device to the user-side device. The transmit power of the pilot channel may be represented by CPICH_Tx_Power.

Step 4013: The user-side device determines a path loss according to the receive power of the pilot channel and the transmit power of the pilot channel.

Optionally, the user-side device may specifically acquire the path loss by acquiring a difference between the transmit power of the pilot channel and the receive power of the pilot channel. That is, the path loss may be represented by: CPICH_Tx_Power−CPICH_RSCP.

Step 4014: The user-side device determines the path loss level according to the path loss.

Optionally, the path loss level may be represented by a power value corresponding to the path loss or by a power value range to which the path loss belongs. If the path loss level is represented by the power value corresponding to the path loss, the user-side device directly determines the path loss level according to the path loss. If the path loss level is represented by the power value range to which the path loss belongs, the user-side device may determine, according to the path loss, the path loss power value range to which the path loss belongs, and then determine the path loss level corresponding to the power value range to which the path loss belongs. For example, if the path loss is 6 dB, a path loss range corresponding to the first path loss level is 5 dB to 10 dB, and a path loss range corresponding to the second path loss level is 10 dB to 15 dB, the user-side device may determine that the path loss 6 dB belongs to the path loss range of 5 dB to 10 dB, and then may determine that the path loss level of the user-side device is the first path loss level. It should be noted that a path loss range corresponding to each path loss level may be preset according to a situation such as a quantity of user-side devices in the current network, a distance from the network-side device, or a road obstacle, and that a total of path loss levels may also be set according to the situation such as the quantity of user-side devices in the current network, the distance from the network-side device, or the road obstacle; however, the path loss range corresponding to each path loss level and the total of path loss levels are not limited to the foregoing examples.

Optionally, in the foregoing solution, that the user-side device acquires a transmit power of the pilot channel in step 4012 may include: the user-side device receives the transmit power of the pilot channel that is sent by the network-side device by means of broadcast.

Optionally, the network-side device may send, by sending broadcast, a transmit power of a pilot channel corresponding to each user-side device, and after receiving the broadcast, the user-side device may determine, according to information such as an identity of the user-side device or a service identity, the transmit power of the pilot channel corresponding to the user-side device.

Optionally, that the user-side device queries, according to the coverage level, a correspondence between coverage level and repetition factor, and determines the repetition factor corresponding to the coverage level in step 302 may include: the user-side device queries the correspondence between coverage and repetition factor according to the coverage, and obtains at least one of a repetition factor of an uplink data channel, a repetition factor of an uplink control channel, a repetition factor of a downlink common channel, and a repetition factor of a downlink dedicated channel that correspond to the coverage level.

Figure 5:
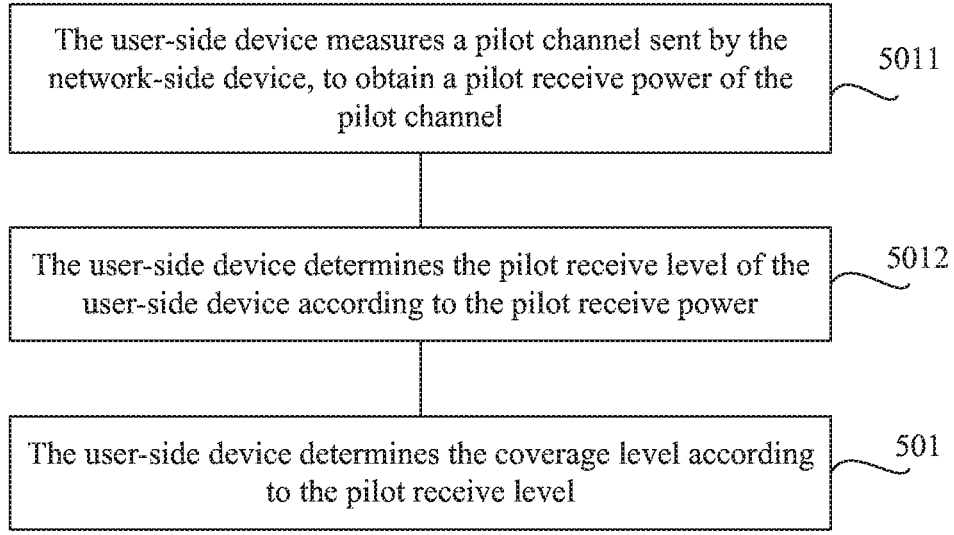
FIG. 5 is a flowchart of another information transmission method according to Embodiment 3 of the present invention.

FIG. 5 is a flowchart of another information transmission method according to Embodiment 3 of the present invention. On a basis of Embodiment 3 of the present invention, as shown in FIG. 5, alternatively, that the user-side device determines a coverage level of the user-side device in step 301 in this method may include.

Step 501: The user-side device determines the coverage level according to a pilot receive level.

Optionally, before the user-side device determines the coverage level according to the pilot receive level in step 501, the method may include.

Step S011: The user-side device measures a pilot channel sent by the network-side device, to obtain a pilot receive power of the pilot channel.

Step S012: The user-side device determines the pilot receive level of the user-side device according to the pilot receive power.

Figure 6:
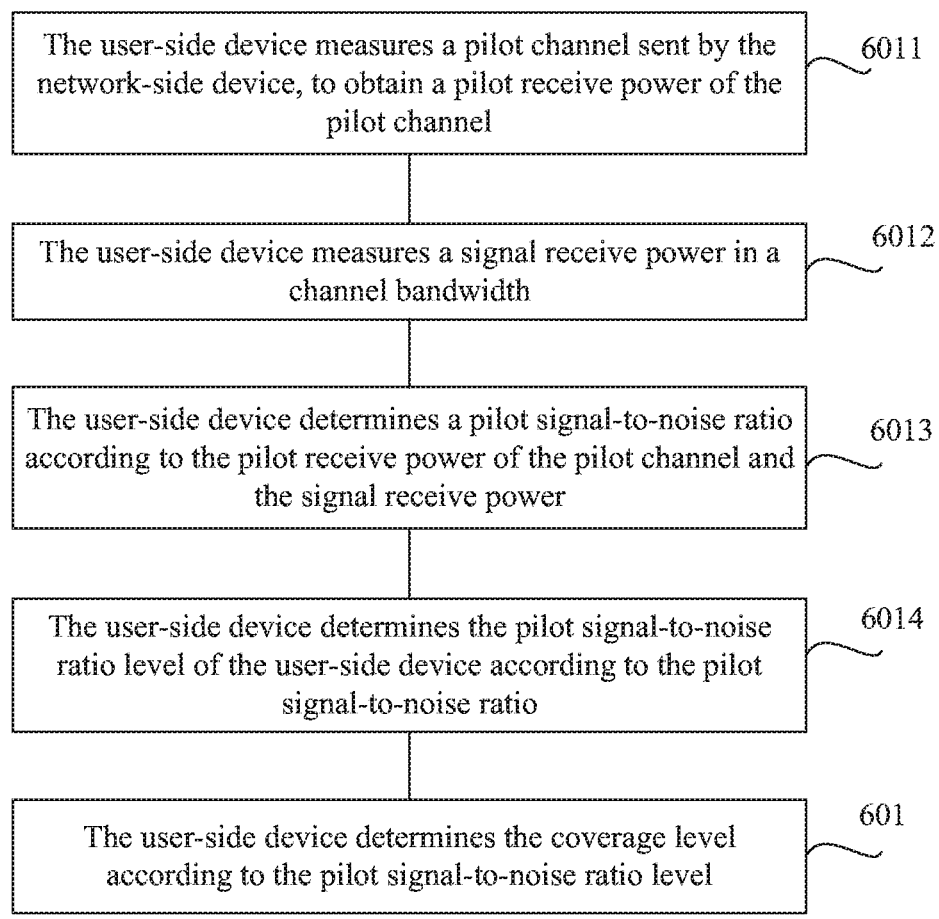
FIG. 6 is a flowchart of still another information transmission method according to Embodiment 3 of the present invention.

Alternatively, the embodiment of the present invention further provides an information transmission method. FIG. 6 is a flowchart of still another information transmission method according to Embodiment 3 of the present invention. On a basis of Embodiment 3 of the present invention, as shown in FIG. 6, that the user-side device determines a coverage level of the user-side device in step 301 in this method may include.

Step 601: The user-side device determines the coverage level according to a pilot signal-to-noise ratio level.

Optionally, before the user-side device determines the coverage level according to the pilot receive level in step 601, the method may include.

Step 6011: The user-side device measures a pilot channel sent by the network-side device, to obtain a pilot receive power of the pilot channel.

Step 6012: The user-side device measures a signal receive power in a channel bandwidth.

Optionally, the signal receive power in the channel bandwidth is a received signal strength indicator (RSSI for short). The RSSI may be the signal receive power in the channel bandwidth of a pulse shaping filter in a receiver of the user-side device, including thermal noise and noise that is generated in the receiver.

Step 6013: The user-side device determines a pilot signal-to-noise ratio according to the pilot receive power of the pilot channel and the signal receive power.

Optionally, the user-side device may specifically acquire the signal-to-noise ratio by acquiring a ratio of the receive power of the pilot channel to the signal receive power. The signal-to-noise ratio may be represented by CPICH_RSCP/RSSI.

Step 6014: The user-side device determines the pilot signal-to-noise ratio level of the user-side device according to the pilot signal-to-noise ratio.

It should be noted that, that the user-side device determines the pilot receive level of the user-side device according to the pilot receive power in the foregoing step 5012 and that the user-side device determines the pilot signal-to-noise ratio level of the user-side device according to the pilot signal-to-noise ratio in the step 6014 are similar to the process in which the user-side device determines the path loss level according to the path loss in the foregoing step 4014, and are not further described herein.

In the method in this embodiment, a user-side device determines a coverage level of the user-side device, and determines a repetition factor based on the coverage level, so that the coverage level of the user-side device and a network-side device corresponds to the repetition factor of the user-side device, thereby reducing unnecessary resource waste.

Embodiment 4

Figure 7:
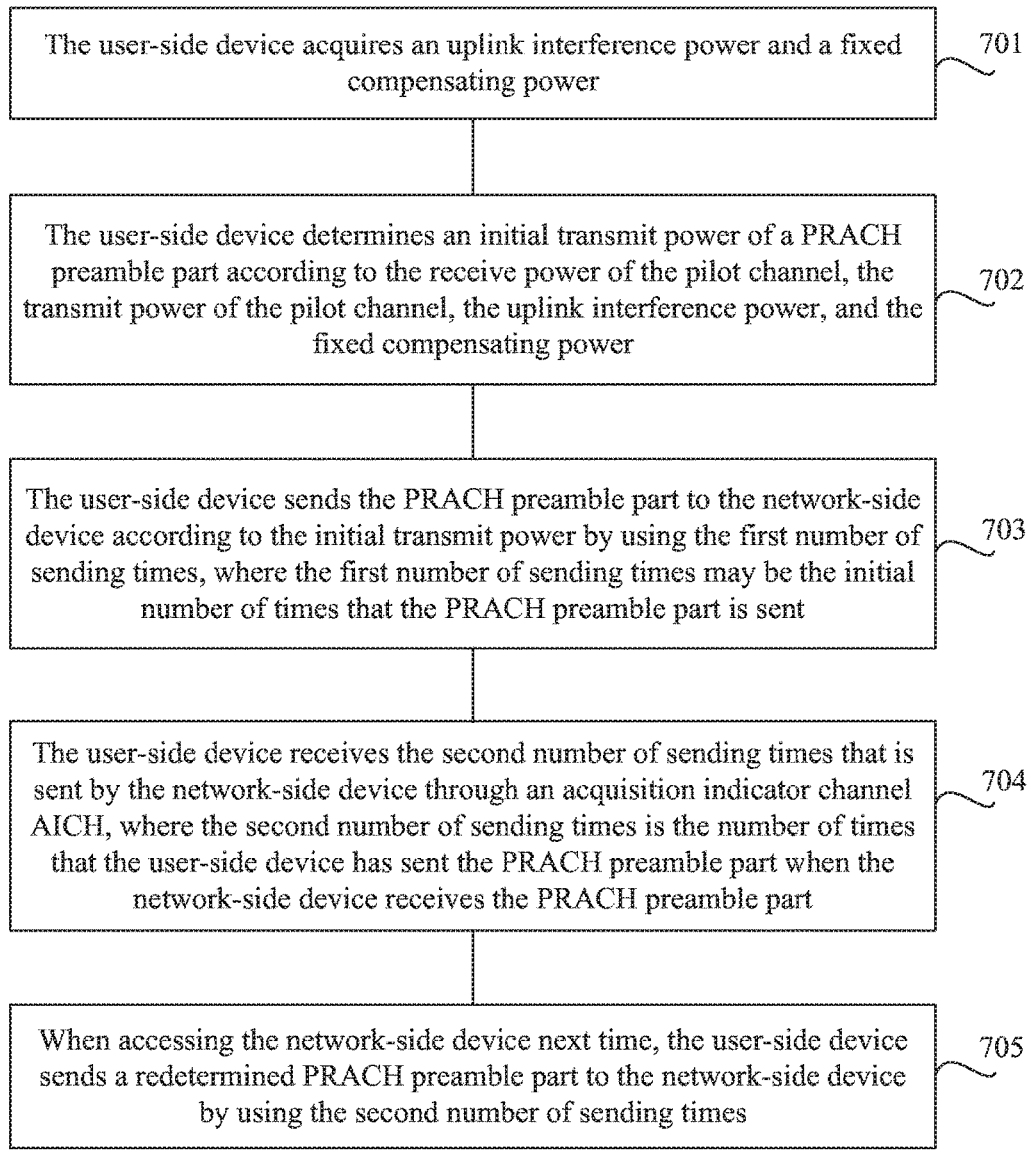
FIG. 7 is a flowchart of an information transmission method according to Embodiment 4 of the present invention.

FIG. 7 is a flowchart of an information transmission method according to Embodiment 4 of the present invention. Embodiment 4 of the present invention further provides an information transmission method. As shown in FIG. 7, on a basis of the information transmission method in the foregoing Embodiment, optionally, the method further includes.

Step 701: The user-side device acquires an uplink interference power and a fixed compensating power.

Optionally, the uplink interference (UL_Interference for short) power refers to an interference power generated when the user-side device sends uplink information to the network-side device, and may be represented by UL_Interference. The uplink interference power may be a power parameter that is preconfigured in the user-side device, or may be a power parameter that is configured and sent by the network-side device and received by the user-side device. The fixed compensating power is a preconfigured minimum power value that is required for transmitting information between the user-side device and the network-side device, or may be a minimum power value that is configured or adjusted by the network-side device and required for transmitting a message between the network-side device and the user-side device, and may be represented by Constant_Value.

Step 702: The user-side device determines an initial transmit power of a PRACH preamble part according to the receive power of the pilot channel, the transmit power of the pilot channel, the uplink interference power, and the fixed compensating power.

The initial transmit power of the PRACH preamble part may be represented by Preamble_Initial_Power. Therefore, the Preamble_Initial_Power may be obtained by using the following formula (1):

$$(\text{Preamble\_Initial\_Power}) = (\text{CPICH\_Tx\_Power}) - (\text{CPICH\_RSCP}) + (\text{UL\_Interference}) + (\text{Constant\_Value}) \quad (1).$$

For example, if CPICH_Tx_Power is 15 dB, CPICH_RSCP is 8 dB, UL_Interference is 2 dB, and Constant_Value is 2 dB, Preamble_Initial_Power is 11 dB.

Step 703: The user-side device sends the PRACH preamble part to the network-side device according to the initial transmit power by using the first number of sending times, where the first number of sending times may be the initial number of times that the PRACH preamble part is sent.

The first number of sending times may be a value preconfigured by the network-side device.

Optionally, that the user-side device acquires an uplink interference power and a fixed compensating power in step 701 may include: the user-side device receives the uplink interference power and at least one fixed compensating power parameter that are sent by the network-side device by means of broadcast; and the user-side device determines the fixed compensating power according to the at least one fixed compensating power parameter.

Optionally, if the at least one fixed compensating power parameter includes one power parameter, the user-side device may determine that the one power parameter is the fixed compensating power.

Optionally, if the at least one fixed compensating power parameter includes at least two power parameters, the user-side device may determine one power parameter from the at least two power parameters according to the coverage level of the user-side device, and use it as the fixed compensating power.

Specifically, the user-side device may compare the coverage level of the user-side device with a preset coverage level, select one power parameter from the at least two power parameters according to a comparison result, and use it as the fixed compensating power.

For example, if the at least one fixed compensating power parameter includes two power parameters, where the first power parameter is X1, and the second power parameter is X2, a relationship between the first power parameter X1 and the second power parameter X2 may be shown in the following formula (2):

$$X2 = X1 - 10*\log(N) \quad (2)$$

where, N is the first number of sending times.

Optionally, if the coverage level of the user-side device is higher than the preset coverage level, the user-side device selects one power parameter from the at least two power parameters, and uses it as the fixed compensating power, where the one power parameter is smaller than a power parameter corresponding to the preset coverage level.

If the coverage level of the user-side device is equal to the preset coverage level, the user-side device selects one power parameter from the at least two power parameters, and uses it as the fixed compensating power, where the one power parameter is equal to the power parameter corresponding to the preset coverage, or an absolute value of a difference between the one power parameter and the preset coverage level is within a preset range.

If the coverage level of the user-side device is lower than the preset coverage level, the user-side device selects one power parameter from the at least two power parameters, and uses it as the fixed compensating power, where the one power parameter is greater than the power parameter corresponding to the preset coverage level.

For example, the at least one fixed compensating power parameter includes two parameters, where the two power parameters are both configured by the network-side device and sent to the user-side device by means of broadcast. The two power parameters may be, for example, −30 dB and −15 dB. The preset coverage level is the second level, and a power parameter corresponding to the second level is −20 dB. Assuming that the coverage level of the user-side device is the first level, and the first level is lower than the second level, the user-side device selects −30 dB; conversely, if the coverage level of the user-side device is the third level, and the third level is higher than the second level, the user-side device selects −15 dB.

Further, that the user-side device determines an initial transmit power of a PRACH preamble part according to the receive power of the pilot channel, the transmit power of the pilot channel, the uplink interference power, and the fixed compensating power in step 702 may specifically include: the user-side device determines, according to the first number of sending times, a power parameter corresponding to the PRACH preamble part; and the user-side device determines the initial transmit power according to the receive power of the pilot channel, the transmit power of the pilot channel, the uplink interference power, the fixed compensating power, and the power parameter corresponding to the PRACH preamble part.

Optionally, the power parameter corresponding to the PRACH preamble part may be represented by Delta. The Delta may be −10*log 10(N), where N is the first number of sending times. For example, the initial transmit power may be obtained by using the following formula (3):

$$(\text{Preamble\_Initial\_Power}) = (DL\_\text{CPICH\_Tx\_Power}) - (DL\_\text{CPICH\_RSCP}) + (\text{UL\_Interference}) + (\text{Constant\_Value}) + \text{Delta} \quad (3).$$

It should be noted that, the Delta may also be obtained in another manner by using the first number of sending times, for example, by using a variant of the formula −10*log 10(N), but is not limited to the foregoing expression.

Further, the method in this embodiment may further include.

Step 704: The user-side device receives the second number of sending times that is sent by the network-side device through an acquisition indicator channel AICH, where the second number of sending times is the number of times that the user-side device has sent the PRACH preamble part when the network-side device receives the PRACH preamble part.

Figure 8:
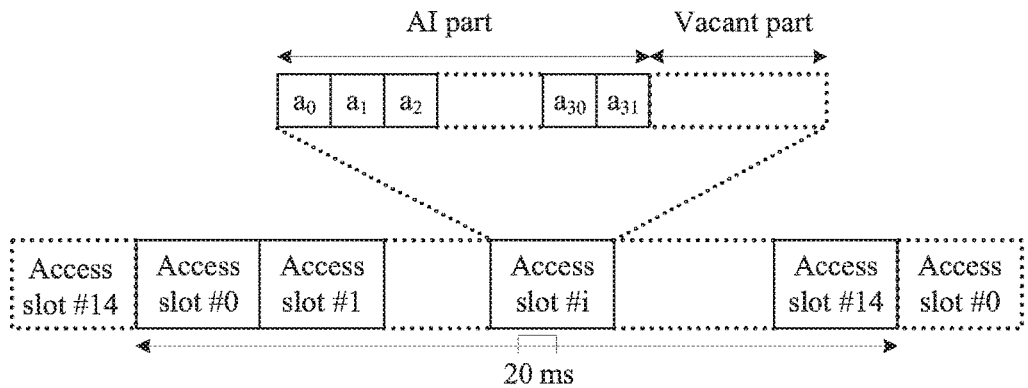
FIG. 8 is a schematic structural diagram of an acquisition indicator channel (AICH) according to Embodiment 4 of the present invention.

Optionally, the network-side device may use a vacant part of 1024 chips in the acquisition indicator channel (Acquisition Indicator Channel, AICH for short) to carry the second number of sending times, to send the second number of sending times to the user-side device. The AICH includes acquisition indicator (AI for short) information and the second number of sending times. FIG. 8 is a schematic structural diagram of an AICH according to Embodiment 4 of the present invention. As shown in FIG. 8, the AICH includes 15 repetitive access timeslots (AS). A length of each AS is 5120 chips, and each AS includes an AI part and a vacant part. The AI part has a length of 4096 chips, and is made up of 32 real-value symbols such as $a_0$ and $a_{31}$. The vacant part is 1024 chips. The AICH is sent to the user-side device according to the preset number of sending times, for example, the third number of sending times. At each sending time, a value of the second number of sending times carried in the AICH is the same.

It should be noted that the user-side device may send, after receiving the AI message sent by the network-side device through the AICH, the PRACH message part to the network-side device according to the uplink repetition factor.

The user-side device sends the PRACH preamble part to the network-side device by using the first number of sending times. If the network-side device has obtained the complete PRACH preamble part when sending the second number of sending times to the user-side device, the network-side device may send the second number of sending times to the user-side device. The second number of sending times may be less than or equal to the first number of sending times. For example, if the first number of sending times is 10, and the network-side device has received the complete PRACH preamble part when sending 8 times to the user-side device, the network-side device may determine that 8 is the second number of sending times.

Step 705: When accessing the network-side device next time, the user-side device sends a redetermined PRACH preamble part to the network-side device by using the second number of sending times.

In the solution of this embodiment, a user-side device further receives the second number of sending times that is sent by a network-side device. Therefore, the number of times that the user-side device sends a PRACH preamble part when accessing the network-side device next time may be reduced, and unnecessary resource waste is avoided.

Embodiment 5

Embodiment 5 of the present invention further provides an information transmission method. On a basis of the information transmission method in the solution of any one of the foregoing Embodiment 1 to Embodiment 4, optionally, that the user-side device sends a repetition factor to a network-side device in the foregoing step 201 may specifically include: the user-side device adds the repetition factor to a control part in the PRACH message part, and sends the control part in the PRACH message part to the network-side device through a DPCCH; or the user-side device adds the repetition factor to an E-DPCCH, and sends the E-DPCCH to the network-side device.

Optionally, the user-side device may send, in the CELL_FACH state or in the enhanced CELL_FACH state, the control part carrying the repetition factor, in the PRACH message part to the network-side device through the DPCCH.

Figure 9:
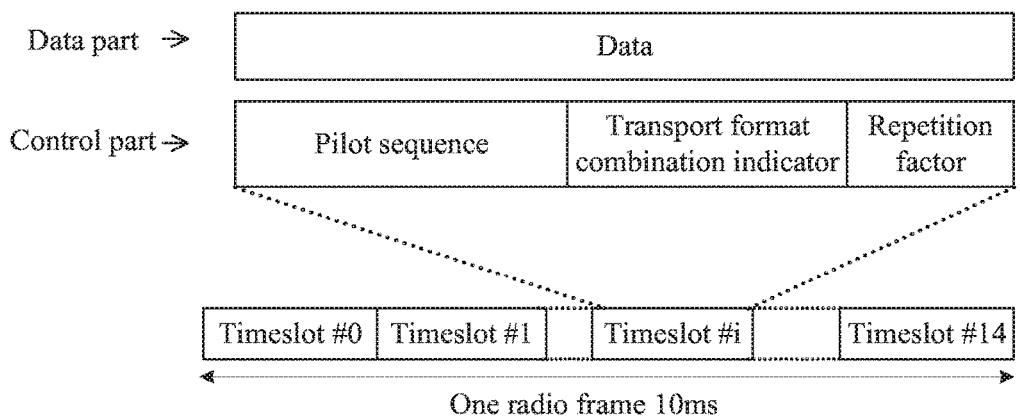
FIG. 9 is a schematic structural diagram of a radio frame of a PRACH message part according to Embodiment 5 of the present invention.

FIG. 9 is a schematic structural diagram of a radio frame of a PRACH message part according to Embodiment 5 of the present invention. As shown in FIG. 9, one radio frame, namely toms, in the PRACH message part may include 15 timeslots, and a length of each timeslot is 2560 chips. Each timeslot includes a data part and a control part. Data transmitted in the data part is data of a random access channel RACH. The control part is used to transmit control information of layer 1, including a pilot sequence and a transport format combination indicator (TFCI for short).

Optionally, the data part and the control part may be transmitted concurrently for transmission. The control part includes an 8-bit pilot sequence and a 2-bit TFCI. In the solution of this embodiment, specifically, 2 bits for transmitting the pilot sequence may be used to transmit a repetition factor, and therefore the control part in the PRACH message part may include a 6-bit pilot sequence, a 2-bit TFCI, and a 2-bit repetition factor. Because a maximum repetition factor of 4 may be carried in two bits, in the solution of this embodiment, two bits may be selected from the control part in each timeslot in the 15 timeslots of the PRACH to carry a repetition factor, and then two bits of each of the 15 timeslots are combined to carry a repetition factor, thereby meeting a requirement on a repetition factor size.

Figure 10:
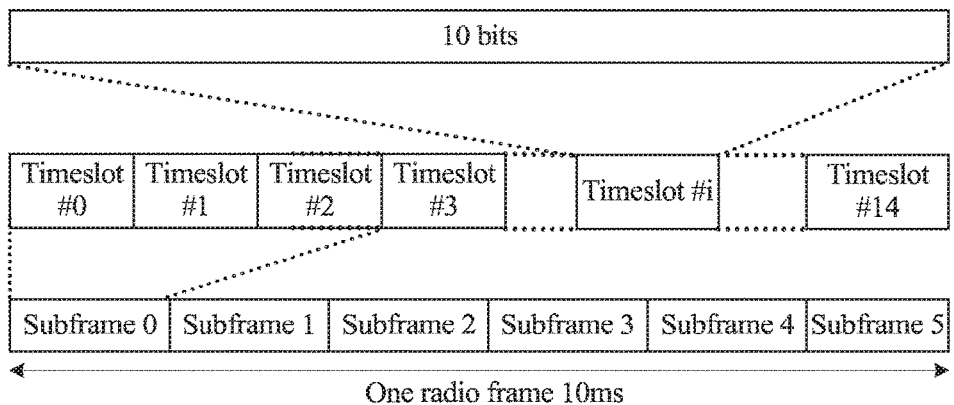
FIG. 10 is a schematic structural diagram of a frame of an enhanced dedicated physical control channel (E-DPCCH) according to Embodiment 5 of the present invention.

Alternatively, if the user-side device is in the enhanced CELL_FACH state, the user-side device may also add a repetition factor to an E-DPCCH, and send the E-DPCCH to the network-side device. FIG. 10 is a schematic structural diagram of a frame of an E-DPCCH according to Embodiment 5 of the present invention. As shown in FIG. 10, one radio frame in the E-DPCCH includes five subframes, where each subframe includes three timeslots. Each timeslot of the E-DPCCH is 10 bits, including a 7-bit enhanced transport format combination indicator (E-TFCI for short), a 2-bit retransmission sequence number (RSN for short), and 1 happy bit. In the solution of this embodiment, a repetition factor may be carried by using 10 bits in each timeslot of the E-DPCCH. By using a time division multiplexing mode, the user-side device may send, the repetition factor carried in the E-DPCCH and the control information carried in the control part in the PRACH message part sent through the E-DPCCH.

Further, in the foregoing solution, the correspondence between coverage level and repetition factor includes a feature code range, corresponding to the coverage level, of the PRACH preamble part.

Alternatively, in the solution of the foregoing embodiment, that the user-side device sends a repetition factor to a network-side device in step 201 may specifically include: the user-side device sends a feature code corresponding to the PRACH preamble part to the network-side device, so that the network-side device determines the repetition factor according to the feature code range to which the feature code corresponding to the PRACH preamble part belongs.

Optionally, the feature code corresponding to the PRACH preamble part may be any one feature code that is selected by the user-side device from the feature code range corresponding to the coverage level of the user-side device by querying the correspondence between coverage level and repetition factor according to the determined coverage level after the user-side device determines the coverage level of the user-side device. The feature code range corresponding to the coverage level may be that all feature codes are evenly grouped according to a preset quantity of coverage levels in the current network system, where quantities of feature codes in the groups may be the same, or may be different.

For example, the correspondence between coverage level and repetition factor is a correspondence between path loss level and repetition factor. In the current network system, the path loss between the user-side device and the network-side device may include four different path loss levels. There are a total of 16 feature codes in the current network system, for example, P0 to P15, and a quantity of path loss levels is 4. That is, in the current network, the user-side device may include a maximum of four different path loss levels, and each path loss level corresponds to a path loss in a preset range. The correspondence between path loss level and repetition factor may be, for example, shown in Table 4.

TABLE 4

| Path loss level | Repetition factor | Feature code range |
|---|---|---|
| 1 | 4 | P0 to P3 |
| 2 | 8 | P4 to P7 |
| 3 | 16 | P8 to P11 |
| 4 | 100 | P12 to P15 |

As shown in the Table 4, a feature code range corresponding to each path loss level may be, for example, as follows: A feature code range corresponding to the first path loss level is P0 to P3; a feature code range corresponding to the second path loss level is P4 to P7; a feature code range corresponding to the third path loss level is P8 to P11; and a feature code range corresponding to the fourth path loss level is P12 to P15. If the path loss level of the user-side device is the first path loss level, the feature code corresponding to the PRACH preamble part may be: the user-side device queries, according to the first path loss level, the correspondence between path loss level and repetition factor, for example, the Table 4, obtains the feature code range corresponding to the first path loss level, for example, P0 to P3, and then uses any one of P0 to P3 as the feature code of the PRACH preamble part, for example, P2.

For example, the correspondence between coverage level and repetition factor is a correspondence between pilot receive level and repetition factor. In the current network system, the pilot receive power between the user-side device and the network-side device may include four different pilot receive levels. There are a total of 16 feature codes in the current network system, for example, P0 to P15, and a quantity of pilot receive levels is 4. That is, in the current network, the user-side device may include a maximum of four different pilot receive levels, and each pilot receive level corresponds to a pilot receive power in a preset range. The correspondence between pilot receive level and repetition factor may be, for example, shown in Table 5.

TABLE 5

| Pilot receive level | Repetition factor | Feature code range |
|---|---|---|
| 1 | 100 | P0 to P3 |
| 2 | 16 | P4 to P7 |
| 3 | 8 | P8 to P11 |
| 4 | 4 | P12 to P15 |

As shown in the Table 5, a feature code range corresponding to each pilot receive level may be, for example, as follows: A feature code range corresponding to the first pilot receive level is P0 to P3; a feature code range corresponding to the second pilot receive level is P4 to P7; a feature code range corresponding to the third pilot receive level is P8 to P11; and a feature code range corresponding to the fourth pilot receive level is P12 to P15. If the pilot receive level of the user-side device is the first pilot receive level, the feature code corresponding to the PRACH preamble part may be: the user-side device queries, according to the first pilot receive level, the correspondence between pilot receive level and repetition factor, for example, the Table 5, obtains the feature code range corresponding to the first pilot receive level, for example, P0 to P3, and then uses any one of P0 to P3 as the feature code of the PRACH preamble part, for example, P2.

For example, the correspondence between coverage level and repetition factor is a correspondence between pilot signal-to-noise ratio level and repetition factor. In the current network system, the pilot signal-to-noise ratio between the user-side device and the network-side device may include four different pilot signal-to-noise ratio levels. There are a total of 16 feature codes in the current network system, for example, P0 to P15, and a quantity of pilot signal-to-noise ratio levels is 4. That is, in the current network, the user-side device may include a maximum of four different pilot signal-to-noise ratio levels, and each pilot signal-to-noise ratio level corresponds to a pilot signal-to-noise ratio in a preset range. The correspondence between pilot signal-to-noise ratio level and repetition factor may be, for example, shown in Table 6.

TABLE 6

| Pilot signal-to-noise ratio level | Repetition factor | Feature code range |
|---|---|---|
| 1 | 100 | P0 to P3 |
| 2 | 16 | P4 to P7 |
| 3 | 8 | P8 to P11 |
| 4 | 4 | P12 to P15 |

As shown in the Table 6, a feature code range corresponding to each pilot signal-to-noise ratio level may be, for example, as follows: A feature code range corresponding to the first pilot signal-to-noise ratio level is P0 to P3; a feature code range corresponding to the second pilot signal-to-noise ratio level is P4 to P7; a feature code range corresponding to the third pilot signal-to-noise ratio level is P8 to P11; and a feature code range corresponding to the fourth pilot signal-to-noise ratio level is P12 to P15. If the pilot signal-to-noise ratio level of the user-side device is the first pilot signal-to-noise ratio level, the feature code corresponding to the PRACH preamble part may be: the user-side device queries, according to the first pilot signal-to-noise ratio level, the correspondence between pilot signal-to-noise ratio level and repetition factor, for example, the Table 6, obtains the feature code range corresponding to the first pilot signal-to-noise ratio level, for example, P0 to P3, and then uses any one of P0 to P3 as the feature code of the PRACH preamble part, for example, P2.

It should be noted that, in the correspondence between path loss level and repetition factor as shown in Table 4, a specific value of the number of times represented by a repetition factor corresponding to each path loss level may also be another value, and that the feature code range corresponding to each path loss level may also be obtained by division according to another manner. The embodiment of the present invention is not limited thereto. Each level and repetition factor in Table 5 and Table 6 are similar to those in the foregoing Table 4, and are not further described.

The correspondence between coverage level and repetition factor includes a repetition factor corresponding to a coverage level and a feature code range corresponding to the coverage level. Therefore, for a repetition factor, there is a unique feature code range, and the correspondence between coverage level and repetition factor is known to any one user-side device and network-side device in the current network system, and may be configured by the network-side device, that is, the network-side device also stores and has the correspondence between coverage level and repetition factor. Therefore, in the solution of this embodiment, the user-side device sends the repetition factor to the network-side device by using the feature code corresponding to the PRACH preamble part, and does not need to use an additional data transmission procedure to send the repetition factor; and the network-side device may also determine the repetition factor, thereby reducing an unnecessary signaling procedure.

Optionally, before the user-side device queries, according to the coverage level, the correspondence between coverage level and repetition factor, and determines the repetition factor corresponding to the coverage level in the foregoing step 302, the method further includes: the user-side device receives the correspondence between coverage level and repetition factor, where the correspondence between coverage level and repetition factor is sent by the network-side device by means of broadcast or dedicated signaling.

In the solution of this embodiment, on a basis of the method provided in each of the foregoing embodiments, multiple alternative methods for sending a repetition factor are used to ensure accurate and effective transmission of the repetition factor.

Embodiment 6

Figure 11:
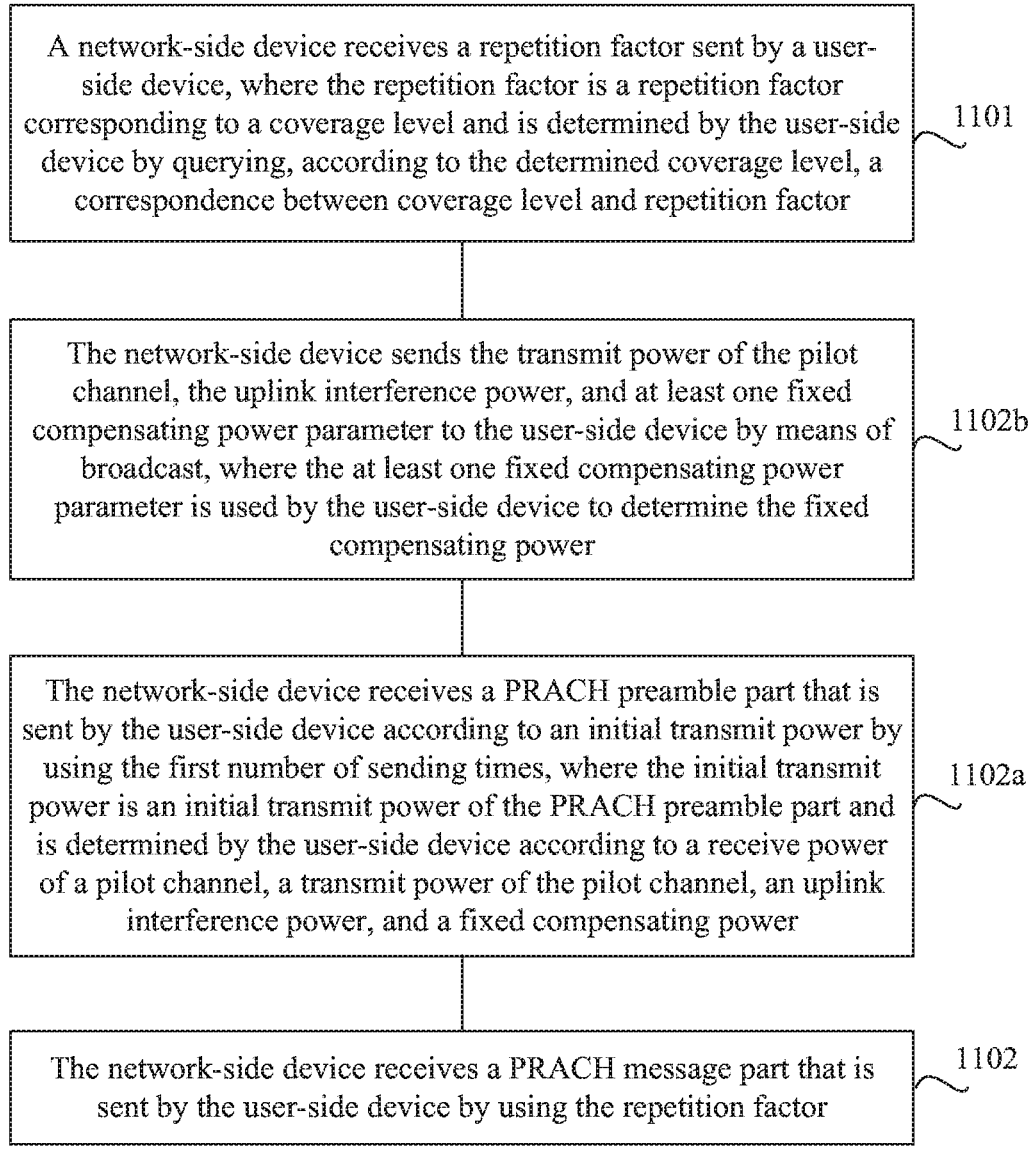
FIG. 11 is a flowchart of an information transmission method according to Embodiment 6 of the present invention.

FIG. 11 is a flowchart of an information transmission method according to Embodiment 6 of the present invention. The embodiment of the present invention further provides an information transmission method. The method may be performed by a network-side device. As shown in FIG. 11, the method may specifically include the following.

Step 1101: A network-side device receives a repetition factor sent by a user-side device, where the repetition factor is a repetition factor corresponding to a coverage level and is determined by the user-side device by querying, according to the determined coverage level, a correspondence between coverage level and repetition factor.

Step 1102: The network-side device receives a PRACH message part that is sent by the user-side device by using the repetition factor.

The solution provided by this embodiment is a method embodiment performed by the network-side device corresponding to the solutions of the foregoing Embodiment 1 to Embodiment 5. A specific implementation process and beneficial effect thereof are similar to those in the foregoing Embodiment 1 to Embodiment 5, and are not further described herein.

Further, in the solution of the embodiment, the repetition factor includes an uplink repetition factor and a downlink repetition factor.

Optionally, that a network-side device receives a repetition factor sent by a user-side device in the foregoing step 1101 may include: the network-side device receives the uplink repetition factor and the downlink repetition factor that are sent by the user-side device.

Correspondingly, in the solution, that the network-side device receives a PRACH message part that is sent by the user-side device by using the repetition factor in step 1102 may include: the network-side device receives the PRACH message part that is sent by the user-side device by using the uplink repetition factor.

Further, the method in this embodiment further includes: the network-side device sends downlink information to the user-side device by using the downlink repetition factor.

Optionally, on a basis of the solution of the embodiment, the uplink repetition factor is the number of repetition times that the user-side device sends the PRACH message part, and the downlink repetition factor is the number of repetition times that the network-side device sends the downlink information.

Optionally, in the solution of the embodiment, before the network-side device receives the PRACH message part that is sent by the user-side device by using the repetition factor in step 1102, the method further includes.

Step 1102*a*: The network-side device receives a PRACH preamble part that is sent by the user-side device according to an initial transmit power by using the first number of sending times, where the initial transmit power is an initial transmit power of the PRACH preamble part and is determined by the user-side device according to a receive power of a pilot channel, a transmit power of the pilot channel, an uplink interference power, and a fixed compensating power.

The first number of sending times is the initial number of times that the PRACH preamble part is sent.

Optionally, on a basis of the solution of the embodiment, before the network-side device receives the PRACH preamble part that is sent by the user-side device according to the initial transmit power by using the first number of sending times in step 1102*a*, the method further includes.

Step 1102*b*: The network-side device sends the transmit power of the pilot channel, the uplink interference power, and at least one fixed compensating power parameter to the user-side device by means of broadcast, where the at least one fixed compensating power parameter is used by the user-side device to determine the fixed compensating power.

It should be noted that there is no absolute time sequence relationship between step 1101 and step 1102*b* in the solution of the embodiment, that is, step 1101 and step 1102*b* may be performed concurrently or may be performed successively. The embodiment of the present invention is not limited thereto.

Further, the initial transmit power may also be the initial transmit power of the PRACH preamble part and determined by the user-side device according to the receive power of the pilot channel, the transmit power of the pilot channel, the uplink interference power, the fixed compensating power, and a power parameter corresponding to the PRACH preamble part, where the power parameter corresponding to the PRACH preamble part is a power parameter determined by the user-side device according to the first number of sending times.

Optionally, if the at least one fixed compensating power parameter includes one power parameter, the fixed compensating power is the one power parameter determined by the user-side device.

Optionally, if the at least one fixed compensating power parameter includes at least two power parameters, the fixed compensating power may be one power parameter that is determined from the at least two power parameters by the user-side device according to the coverage level of the user-side device.

Optionally, the information transmission method in the embodiment further includes: the network-side device sends the second number of sending times to the user-side device through an AICH, so that when the user-side device accesses the network-side device next time, the user-side device sends a redetermined PRACH preamble part to the network-side device by using the second number of sending times.

The second number of sending times is the number of times that the user-side device has sent the PRACH preamble part when the network-side device receives the PRACH preamble part.

It should be noted that the AICH further includes an AI message. The network-side device may further send the AI message to the user-side device by sending the AICH. After receiving the AI message included in the AICH, the user-side device sends the PRACH message part to the network-side device. That is, the step of sending the second number of sending times may be performed before the step 1102.

On a basis of the solution of the embodiment, that a network-side device receives a repetition factor sent by a user-side device in step 1101 may specifically include: the network-side device receives the repetition factor carried in a control part in the PRACH message part that is sent by the user-side device through a DPCCH; or the network-side device receives the repetition factor carried in an E-DPCCH sent by the user-side device.

Alternatively, in the solution, that a network-side device receives a repetition factor sent by a user-side device in step 1101 may specifically include: the network-side device receives a feature code sent by the user-side device and corresponding to the PRACH preamble part; the network-side device determines, according to the feature code corresponding to the PRACH preamble part, a feature code range to which the feature code corresponding to the PRACH preamble part belongs; and the network-side device determines the repetition factor according to the feature code range to which the feature code corresponding to the PRACH preamble part belongs and the correspondence between coverage level and repetition factor, where the correspondence between coverage level and repetition factor includes the feature code range, corresponding to the coverage level, of the PRACH preamble part.

Alternatively, in the solution, before the network-side device receives the repetition factor sent by the user-side device in step 1101, the method may further include: the network-side device sends the correspondence between coverage level and repetition factor to the user-side device by means of broadcast or dedicated signaling.

The solution provided by this embodiment is a method embodiment performed by the network-side device corresponding to the solutions of the foregoing embodiments. A specific implementation process and beneficial effect thereof are similar to those in the foregoing Embodiment 1 to Embodiment 5, and are not further described herein.

Embodiment 7

Figure 12A:
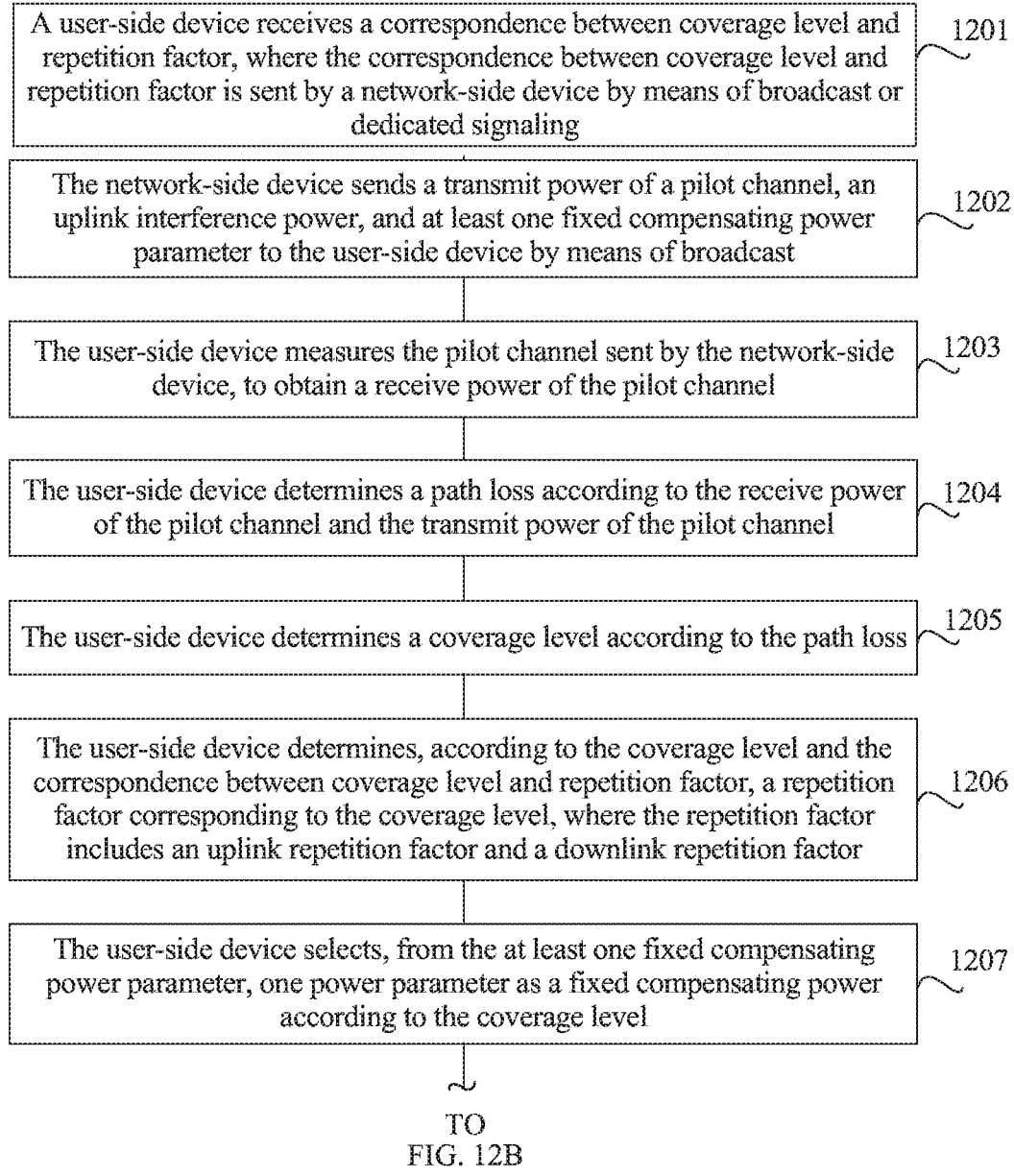
FIG. 12A and FIG. 12B are a flowchart of an information transmission method according to Embodiment 7 of the present invention.
Figure 12B:
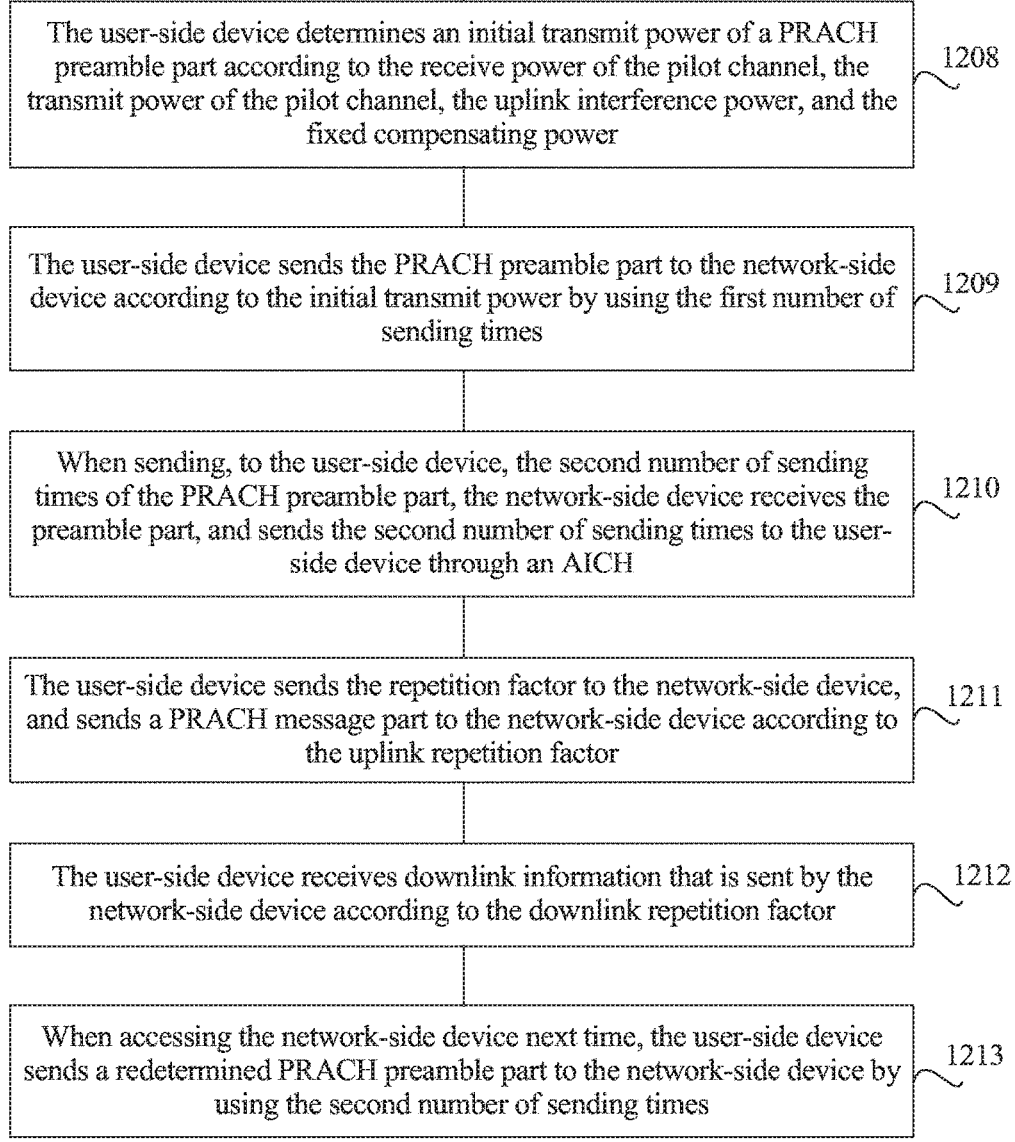

FIG. 12A and FIG. 12B are a flowchart of an information transmission method according to Embodiment 7 of the present invention. The embodiment of the present invention further provides an information transmission method. This embodiment may be performed by a network-side device and a user-side device interactively. The foregoing solutions are explained and described in detail by using a specific example. As shown in FIG. 12A and FIG. 12B, the method includes.

Step 1201: A user-side device receives a correspondence between coverage level and repetition factor, where the correspondence between coverage level and repetition factor is sent by a network-side device by means of broadcast or dedicated signaling.

Step 1202: The network-side device sends a transmit power of a pilot channel, an uplink interference power, and at least one fixed compensating power parameter to the user-side device by means of broadcast.

Step 1203: The user-side device measures the pilot channel sent by the network-side device, to obtain a receive power of the pilot channel.

Step 1204: The user-side device determines a path loss according to the receive power of the pilot channel and the transmit power of the pilot channel.

Step 1205: The user-side device determines a coverage level according to the path loss.

Step 1206: The user-side device determines, according to the coverage level and the correspondence between coverage level and repetition factor, a repetition factor corresponding to the coverage level, where the repetition factor includes an uplink repetition factor and a downlink repetition factor.

Step 1207: The user-side device selects, from the at least one fixed compensating power parameter, one power parameter as a fixed compensating power according to the coverage level.

Step 1208: The user-side device determines an initial transmit power of a PRACH preamble part according to the receive power of the pilot channel, the transmit power of the pilot channel, the uplink interference power, and the fixed compensating power.

Step 1209: The user-side device sends the PRACH preamble part to the network-side device according to the initial transmit power by using the first number of sending times.

It should be noted that the correspondence between coverage level and repetition factor includes a feature code range, corresponding to the coverage level, of the PRACH preamble part, where the coverage level may be represented by a path loss level. Before the step 1209, the user-side device further determines, according to the coverage level, the feature code range corresponding to the coverage level, and randomly selects a feature code from the feature code range corresponding to the coverage level to constitute the preamble part.

For example, the correspondence between coverage level and repetition factor is a correspondence between path loss level and repetition factor. In a current network system, the path loss between the user-side device and the network-side device may include four different path loss levels. The current network system includes 16 feature codes. The correspondence between path loss level and repetition factor may be, for example, shown in Table 7.

TABLE 7

| Path loss level | Repetition factor | | | | Feature code range |
|---|---|---|---|---|---|
| | Uplink data channel | Uplink control channel | Downlink common channel | Downlink dedicated channel | |
| 1 | 4 | 4 | 100 | 4 | P0 to P3 |
| 2 | 8 | 8 | 100 | 8 | P4 to P7 |
| 3 | 16 | 16 | 100 | 16 | P8 to P11 |
| 4 | 100 | 100 | 100 | 100 | P12 to P15 |

If the foregoing determined path loss of the user-side device is 6 dB, but a path loss corresponding to the first level may be 5 dB to 10 dB, the path loss level of the user-side device is the first level. Therefore, the repetition factors of the user-side device that are determined according to the first level include 4 repetition times of the uplink data channel, 4 repetition times of the uplink control channel, 100 repetition times of the downlink common channel, and 4 repetition times of the downlink dedicated channel; the first feature code range of P0 to P3 may be determined according to the first level, and therefore the feature code included in the PRACH preamble part may be any one code in the first feature code range, for example, P2. Repetition factors at different levels increase and decrease with increase and decrease of path loss levels of the repetition factors. Because all user-side devices use a same downlink common channel, the number of repetition times of the downlink common channel may be configured as the maximum number of repetition times. The maximum number of repetition times may be the number of repetition times corresponding to a user-side device with a maximum path loss. It should be noted that the specific value of the repetition factor corresponding to each channel in the foregoing Table 3 may also be another value. This embodiment is not limited thereto.

Step 1210: When sending, to the user-side device, the second number of sending times of the PRACH preamble part, the network-side device receives the preamble part, and sends the second number of sending times to the user-side device through an AICH.

Step 1211: The user-side device sends the repetition factor to the network-side device, and sends a PRACH message part to the network-side device according to the uplink repetition factor.

Optionally, the user-side device may send the repetition factor to the network-side device by using any method for sending the repetition factor in the foregoing embodiments.

Step 1212: The user-side device receives downlink information that is sent by the network-side device according to the downlink repetition factor.

Step 1213: When accessing the network-side device next time, the user-side device sends a redetermined PRACH preamble part to the network-side device by using the second number of sending times.

In the solution provided by this embodiment, the methods in the foregoing embodiments are explained and described by using an example. A specific implementation process and beneficial effect thereof are similar to those in any one of the foregoing embodiments, and are not further described herein.

It should be noted that, in Embodiment 7 of the present invention, the coverage level is determined according to only the path loss level, that is, a situation in which the correspondence between coverage level and repetition factor is a correspondence between path loss level and repetition factor is described by using an example. If the user-side device determines the coverage level according to a pilot receive level or a pilot signal-to-noise ratio level, that is, in a situation in which the correspondence between coverage level and repetition factor is a correspondence between pilot receive level and repetition factor or a correspondence between pilot signal-to-noise ratio level and repetition factor, the correspondence is similar to the above, and is not further described herein.

Embodiment 8

Figure 13:
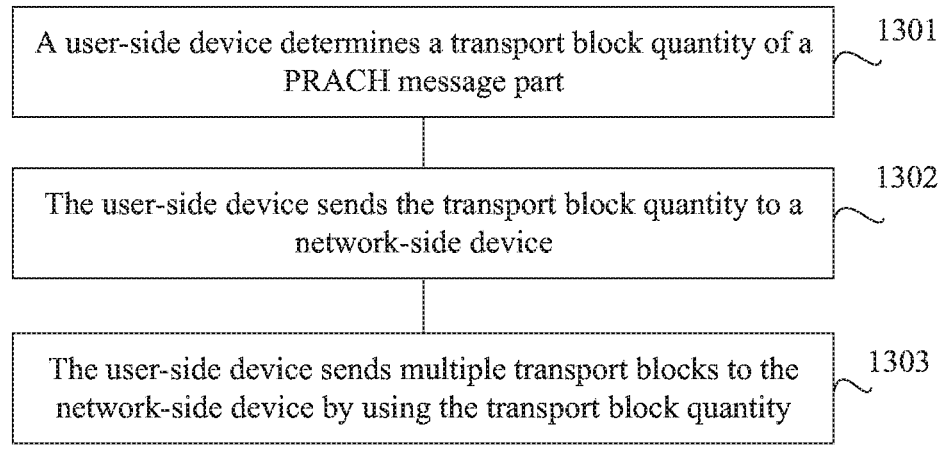
FIG. 13 is a flowchart of an information transmission method according to Embodiment 8 of the present invention.

Embodiment 8 of the present invention further provides an information transmission method. The method may be performed by a user-side device. FIG. 13 is a flowchart of an information transmission method according to Embodiment 8 of the present invention. As shown in FIG. 13, the method may include.

Step 1301: A user-side device determines a transport block quantity of a PRACH message part.

Step 1302: The user-side device sends the transport block quantity to a network-side device.

Step 1303: The user-side device sends multiple transport blocks to the network-side device by using the transport block quantity.

When the PRACH message part is too large and cannot be sent by using a single transport block, the user-side device sends multiple transport blocks to the network-side device by using the transport block quantity. Among the multiple transport blocks, each transport block may include different data. Because the transport block quantity is the transport block quantity of the PRACH message part, the data in each transport block may be different data included in the PRACH message part. The data of the multiple transport blocks may include the PRACH message part. Therefore, after receiving the transport block quantity and the multiple transport blocks, the network-side device may acquire the PRACH message part by combining the data of the multiple transport blocks.

Optionally, that a user-side device determines a transport block quantity of a PRACH message part in step 1301 includes: the user-side device determines the transport block quantity according to a size of the PRACH message part and a size of a single transport block.

Specifically, the transport block quantity may be determined by the user-side device by dividing the size of the PRACH message part by the size of a single transport block. For example, if the data size of the PRACH message part to be sent by the user-side device is 800 bits, and the size of a single transport block, namely, a size of a transport block to be sent on a data channel at a single time, is 360 bits, and a 200-bit packet header is generated in a data segmentation process, the user-side device may divide 1000 bits by 360 bits, and the transport block quantity may be 3.

Optionally, in Embodiment 8 of the present invention, that the user-side device sends the transport block quantity to a network-side device in step 1302 may include: the user-side device adds the transport block quantity to a control part in the PRACH message part, and sends the control part in the PRACH message part to the network-side device through a DPCCH; or the user-side device adds the transport block quantity to an E-DPCCH, and sends the E-DPCCH to the network-side device.

Alternatively, that the user-side device sends the transport block quantity to a network-side device in step 1302 may include: the user-side device sends a feature code corresponding to a PRACH preamble part to the network-side device, so that the network-side device determines the transport block quantity according to a feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

In the information transmission method provided by Embodiment 8 of the present invention, a user-side device determines a transport block quantity of a PRACH message part, and sends the transport block quantity to a network-side device, and further sends multiple transport blocks to the network-side device by using the transport block quantity. The user-side device may release resources after sending the multiple transport blocks. Therefore, multiple times of random access initiated by the user-side device may be avoided, contending for access with another network-side device is avoided, and resources are saved.

Embodiment 9

Figure 14:
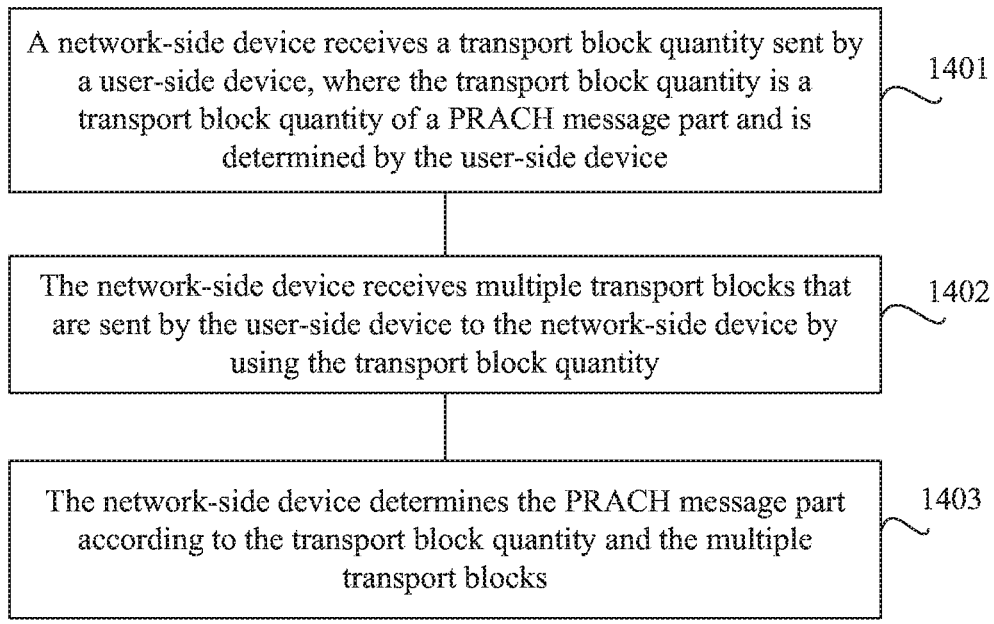
FIG. 14 is a flowchart of an information transmission method according to Embodiment 9 of the present invention.

Embodiment 9 of the present invention further provides an information transmission method. The method may be performed by a network-side device. FIG. 14 is a flowchart of an information transmission method according to Embodiment 9 of the present invention. As shown in FIG. 14, the method may include:

Step 1401: A network-side device receives a transport block quantity sent by a user-side device, where the transport block quantity is a transport block quantity of a PRACH message part and is determined by the user-side device.

Step 1402: The network-side device receives multiple transport blocks that are sent by the user-side device to the network-side device by using the transport block quantity.

Step 1403: The network-side device determines the PRACH message part according to the transport block quantity and the multiple transport blocks.

Optionally, that a network-side device receives a transport block quantity sent by a user-side device in the foregoing step 1401 may include: the network-side device receives the transport block quantity carried in a control part in the PRACH message part that is sent by the user-side device through a DPCCH; or the network-side device receives the transport block quantity carried in an E-DPCCH sent by the user-side device.

Alternatively, that a network-side device receives a transport block quantity sent by a user-side device in the foregoing step 1401 may further include: the network-side device receives a feature code sent by the user-side device and corresponding to a PRACH preamble part; the network-side device determines, according to the feature code corresponding to the PRACH preamble part, a feature code range to which the feature code corresponding to the PRACH preamble part belongs; and the network-side device determines the transport block quantity according to the feature code range to which the feature code corresponding to the PRACH preamble part belongs and a preset correspondence between transport block quantity and feature code range; where the correspondence between transport block quantity and feature code range includes the feature code range, corresponding to the transport block quantity, of the PRACH preamble part.

The information transmission method provided by Embodiment 9 of the present invention is a method performed by the network-side device corresponding to the method in the foregoing Embodiment 8. A specific implementation process and beneficial effect thereof are similar to those in the foregoing embodiment, and are not further described herein.

Embodiment 10

Figure 15:
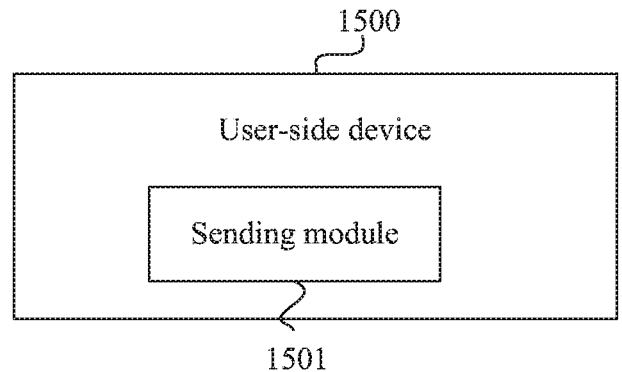
FIG. 15 is a schematic structural diagram of a user-side device according to Embodiment 10 of the present invention.

FIG. 15 is a schematic structural diagram of a user-side device according to Embodiment 10 of the present invention. Embodiment 10 of the present invention provides a user-side device, which may perform the information transmission method provided by any one of the foregoing Embodiment 1 to Embodiment 5.

As shown in FIG. 15, the user-side device 1500 includes: a sending module 1501, configured to send a repetition factor to a network-side device, and send a PRACH message part to the network-side device by using the repetition factor.

Optionally, the user-side device 1500 further includes: a determining module, configured to: before the sending module 1501 sends the repetition factor to the network-side device, determine a coverage level of the user-side device 1500, query, according to the coverage level, a correspondence between coverage level and repetition factor, and determine the repetition factor corresponding to the coverage level.

Further, the repetition factor includes an uplink repetition factor and a downlink repetition factor.

The sending module 1501 is further configured to send the PRACH message part to the network-side device by using the uplink repetition factor, and send the uplink repetition factor and the downlink repetition factor to the network-side device, so that the network-side device receives, by using the uplink repetition factor, the PRACH message part sent by the user-side device, and sends, by using the downlink repetition factor, downlink information to the user-side device.

Optionally, in the solution, the uplink repetition factor is the number of repetition times that the user-side device sends the PRACH message part, and the downlink repetition factor is the number of repetition times that the network-side device sends the downlink information.

Optionally, the determining module is further configured to determine the coverage level according to a path loss level.

Optionally, the determining module is further configured to measure a pilot channel sent by the network-side device, to obtain a receive power of the pilot channel.

The user-side device 1500 further includes: an acquiring module, configured to acquire a transmit power of the pilot channel.

The determining module is further configured to determine a path loss according to the receive power of the pilot channel and the transmit power of the pilot channel, and determine the path loss level according to the path loss.

Optionally, the foregoing user-side device 1500 further includes: a first receiving module, configured to receive the transmit power of the pilot channel that is sent by the network-side device by means of broadcast.

Further, the foregoing acquiring module is further configured to acquire an uplink interference power and a fixed compensating power.

The determining module is further configured to determine an initial transmit power of a PRACH preamble part according to the receive power of the pilot channel, the transmit power of the pilot channel, the uplink interference power, and the fixed compensating power.

The sending module 1501 is further configured to send the PRACH preamble part to the network-side device according to the initial transmit power by using the first number of sending times, where the first number of sending times is the initial number of times that the PRACH preamble part is sent.

Optionally, the user-side device 1500 further includes: a second receiving module, configured to receive the uplink interference power and the fixed compensating power that are sent by the network-side device by means of broadcast.

Alternatively, the foregoing determining module is further configured to determine, according to the first number of sending times, a power parameter corresponding to the PRACH preamble part, and determine the initial transmit power according to the receive power of the pilot channel, the transmit power of the pilot channel, the uplink interference power, the fixed compensating power, and the power parameter corresponding to the PRACH preamble part.

Further, the user-side device 1500 further includes: a third receiving module, configured to receive the second number of sending times that is sent by the network-side device through an AICH, where the second number of sending times is the number of times that the user-side device has sent the PRACH preamble part when the network-side device receives the PRACH preamble part.

The sending module 1501 is further configured to: at a next time of accessing the network-side device, send a redetermined PRACH preamble part to the network-side device by using the second number of sending times.

Optionally, the foregoing sending module 1501 is further configured to: add the repetition factor to a control part in the PRACH message part, and send the control part in the PRACH message part to the network-side device through a DPCCH; or configured to add the repetition factor to an E-DPCCH, and send the E-DPCCH to the network-side device.

Optionally, the correspondence between path loss level and repetition factor includes a feature code range, corresponding to the path loss level, of the PRACH preamble part.

Alternatively, the sending module 1501 is further configured to send a feature code corresponding to the PRACH preamble part to the network-side device, so that the network-side device determines the repetition factor according to the feature code range to which the feature code corresponding to the PRACH preamble part belongs.

Optionally, the user-side device 1500 further includes: a fourth receiving module, configured to: before the determining module queries, according to the coverage level, the correspondence between coverage level and repetition factor, and determines the repetition factor corresponding to the coverage level, receive the correspondence between coverage level and repetition factor, where the correspondence between coverage level and repetition factor is sent by the network-side device by means of broadcast or dedicated signaling.

The foregoing first, second, third, and fourth receiving modules may be a same receiving module, or may be different modules, which is not limited herein.

The user-side device provided by this embodiment may perform the information transmission method described in any one of the foregoing Embodiment 1 to Embodiment 5. A specific implementation process and beneficial effect thereof are similar to those in the foregoing embodiments, and are not further described herein.

Embodiment 11

Figure 16:
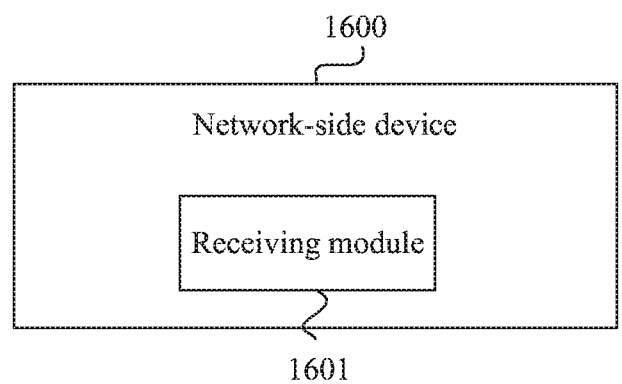
FIG. 16 is a schematic structural diagram of a network-side device according to Embodiment 11 of the present invention.

FIG. 16 is a schematic structural diagram of a network-side device according to Embodiment 11 of the present invention. Embodiment 11 of the present invention provides a network-side device, which may perform the information transmission method provided by the foregoing Embodiment 6.

As shown in FIG. 16, the network-side device 1600 includes: a receiving module 1601, configured to receive a repetition factor sent by a user-side device, and receive a PRACH message part that is sent by the user-side device by using the repetition factor, where the repetition factor is a repetition factor corresponding to a coverage level and is determined by the user-side device by querying, according to the determined coverage level, a correspondence between coverage level and repetition factor.

Further, the repetition factor includes an uplink repetition factor and a downlink repetition factor.

The receiving module 1601 is further configured to receive the uplink repetition factor and the downlink repetition factor that are sent by the user-side device, and receive the PRACH message part that is sent by the user-side device by using the uplink repetition factor.

Optionally, the network-side device 1600 further includes: a first sending module, configured to send downlink information to the user-side device by using the downlink repetition factor.

Further, the uplink repetition factor is the number of repetition times that the user-side device sends the PRACH message part, and the downlink repetition factor is the number of repetition times that the network-side device sends the downlink information.

Optionally, the receiving module 1601 is further configured to: before receiving the PRACH message part that is sent by the user-side device by using the repetition factor, receive a PRACH preamble part that is sent by the user-side device according to an initial transmit power by using the first number of sending times, where the initial transmit power is an initial transmit power of the PRACH preamble part and is determined by the user-side device according to a receive power of a pilot channel, a transmit power of the pilot channel, an uplink interference power, and a fixed compensating power, where the first number of sending times is the initial number of times that the PRACH preamble part is sent.

Further, the network-side device 1600 further includes: a second sending module, configured to: before the receiving module 1601 receives the PRACH preamble part that is sent according to the initial transmit power by using the first number of sending times, send the transmit power of the pilot channel, the uplink interference power, and the fixed compensating power to the user-side device by means of broadcast.

Alternatively, the initial transmit power is the initial transmit power of the PRACH preamble part and is determined by the user-side device according to the receive power of the pilot channel, the transmit power of the pilot channel, the uplink interference power, the fixed compensating power, and a power parameter corresponding to the PRACH preamble part, where the power parameter corresponding to the PRACH preamble part is a power parameter determined by the user-side device according to the first number of sending times.

Further, the network-side device 1600 further includes: a third sending module, configured to send the second number of sending times to the user-side device through an AICH, so that when the user-side device accesses the network-side device next time, the user-side device sends a redetermined PRACH preamble part to the network-side device by using the second number of sending times, where the second number of sending times is the number of times that the user-side device has sent the PRACH preamble part when the network-side device receives the PRACH preamble part.

Optionally, the foregoing receiving module 1601 is further configured to: receive the repetition factor carried in a control part in the PRACH message part that is sent by the user-side device through a DPCCH; or configured to receive the repetition factor carried in an E-DPCCH sent by the user-side device.

Further, the receiving module 1601 is further configured to receive a feature code sent by the user-side device and corresponding to the PRACH preamble part.

The network-side device 1601 further includes: a determining module, configured to determine, according to the feature code corresponding to the PRACH preamble part, a feature code range to which the feature code corresponding to the PRACH preamble part belongs, and determine the repetition factor according to the feature code range to which the feature code corresponding to the PRACH preamble part belongs and the correspondence between coverage level and repetition factor, where the correspondence between coverage level and repetition factor includes the feature code range, corresponding to the coverage level, of the PRACH preamble part.

Optionally, the network-side device 1600 further includes: a fourth sending module, further configured to: before the receiving module 1601 receives the repetition factor sent by the user-side device, send the correspondence between coverage level and repetition factor to the user-side device by means of broadcast or dedicated signaling.

The foregoing first, second, third, and fourth sending modules may be a same sending module, or may be different modules, which is not limited herein.

The network-side device provided by this embodiment may perform the information transmission method described in the foregoing Embodiment 6. A specific implementation process and beneficial effect thereof are similar to those in the foregoing embodiment, and are not further described herein.

Embodiment 12

Figure 17:
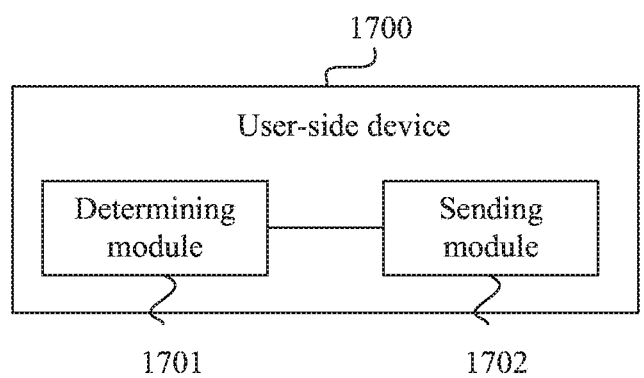
FIG. 17 is a schematic structural diagram of a user-side device according to Embodiment 12 of the present invention.

FIG. 17 is a schematic structural diagram of a user-side device according to Embodiment 12 of the present invention. Embodiment 12 of the present invention provides a user-side device, which may perform the information transmission method provided by the foregoing Embodiment 8.

As shown in FIG. 17, the user-side device 1700 may include: a determining module 1701, configured to determine a transport block quantity of a PRACH message part; and a sending module 1702, configured to send the transport block quantity to a network-side device, and send multiple transport blocks to the network-side device by using the transport block quantity.

Optionally, the determining module 1701 is further configured to determine the transport block quantity according to a size of the PRACH message part and a size of a single transport block.

Optionally, the sending module 1702 is further configured to: add the transport block quantity to a control part in the PRACH message part, and send the control part in the PRACH message part to the network-side device through a DPCCH; or add the transport block quantity to an E-DPCCH, and send the E-DPCCH to the network-side device.

Optionally, the sending module 1702 is further configured to send a feature code corresponding to a PRACH preamble part to the network-side device, so that the network-side device determines the transport block quantity according to a feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

The user-side device provided by this embodiment may perform the information transmission method described in the foregoing Embodiment 8. A specific implementation process and beneficial effect thereof are similar to those in the foregoing embodiment, and are not further described herein.

Embodiment 13

Figure 18:
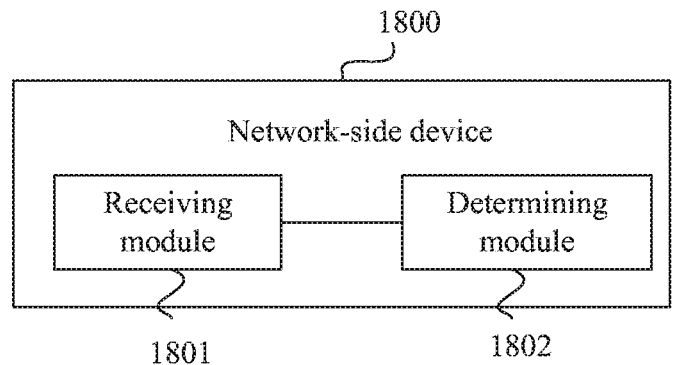
FIG. 18 is a schematic structural diagram of a network-side device according to Embodiment 13 of the present invention.

FIG. 18 is a schematic structural diagram of a network-side device according to Embodiment 13 of the present invention. Embodiment 13 of the present invention provides a network-side device, which may perform the information transmission method provided by the foregoing Embodiment 9.

As shown in FIG. 18, the network-side device 1800 may include: a receiving module 1801, configured to receive a transport block quantity sent by a user-side device, and receive multiple transport blocks that are sent by the user-side device to the network-side device by using the transport block quantity, where the transport block quantity is a transport block quantity of a PRACH message part and is determined by the user-side device; and a determining module 1802, configured to determine the PRACH message part according to the transport block quantity and the multiple transport blocks.

Optionally, the receiving module 1801 is further configured to: receive the transport block quantity carried in a control part in the PRACH message part that is sent by the user-side device through a DPCCH; or receive the transport block quantity carried in an E-DPCCH sent by the user-side device.

Optionally, the receiving module 1801 is further configured to receive a feature code sent by the user-side device and corresponding to a PRACH preamble part.

The determining module 1802 is further configured to determine, according to the feature code corresponding to the PRACH preamble part, a feature code range to which the feature code corresponding to the PRACH preamble part belongs, and determine the transport block quantity according to the feature code range to which the feature code corresponding to the PRACH preamble part belongs and a preset correspondence between transport block quantity and feature code range.

The correspondence between transport block quantity and feature code range includes the feature code range, corresponding to the transport block quantity, of the PRACH preamble part.

The network-side device provided by this embodiment may perform the information transmission method described in the foregoing Embodiment 9. A specific implementation process and beneficial effect thereof are similar to those in the foregoing embodiment, and are not further described herein.

Embodiment 14

Figure 19:
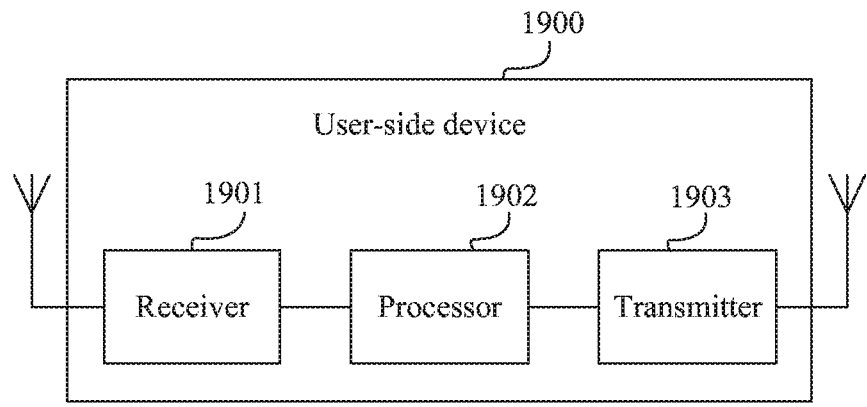
FIG. 19 is a schematic structural diagram of a user-side device according to Embodiment 14 of the present invention.

FIG. 19 is a schematic structural diagram of a user-side device according to Embodiment 14 of the present invention. Embodiment 14 of the present invention provides a user-side device, which may perform the information transmission method described in any one of the foregoing Embodiment 1 to Embodiment 5.

As shown in FIG. 19, the user-side device 1900 includes a receiver 1901, a processor 1902, and a transmitter 1903.

The transmitter 1903 is configured to send a repetition factor to a network-side device, and send a PRACH message part to the network-side device by using the repetition factor.

Optionally, the processor 1902 is configured to: before the transmitter 1903 sends the repetition factor to the network-side device, determine a coverage level of the user-side device, query, according to the coverage level, a correspondence between coverage level and repetition factor, and determine the repetition factor corresponding to the coverage level.

Further, the repetition factor includes an uplink repetition factor and a downlink repetition factor.

The transmitter 1903 is further configured to send the PRACH message part to the network-side device by using the uplink repetition factor, and send the uplink repetition factor and the downlink repetition factor to the network-side device, so that the network-side device receives, by using the uplink repetition factor, the PRACH message part sent by the user-side device, and sends, by using the downlink repetition factor, downlink information to the user-side device.

Optionally, the uplink repetition factor is the number of repetition times that the user-side device sends the PRACH message part, and the downlink repetition factor is the number of repetition times that the network-side device sends the downlink information.

Further, the processor 1902 is further configured to determine the coverage level according to a path loss level.

Optionally, the processor 1902 is further configured to measure a pilot channel sent by the network-side device, to obtain a receive power of the pilot channel, acquire a transmit power of the pilot channel, determine a path loss according to the receive power of the pilot channel and the transmit power of the pilot channel, and determine the path loss level according to the path loss.

Optionally, the receiver 1901 is configured to receive the transmit power of the pilot channel that is sent by the network-side device by means of broadcast.

Optionally, the processor 1902 is further configured to acquire an uplink interference power and a fixed compensating power, determine an initial transmit power of a PRACH preamble part according to the receive power of the pilot channel, the transmit power of the pilot channel, the uplink interference power, and the fixed compensating power, and send the PRACH preamble part to the network-side device according to the initial transmit power by using the first number of sending times, where the first number of sending times is the initial number of times that the PRACH preamble part is sent.

Further, the receiver 1901 is further configured to receive the uplink interference power and the fixed compensating power that are sent by the network-side device by means of broadcast.

Alternatively, the processor 1902 is further configured to determine, according to the first number of sending times, a power parameter corresponding to the PRACH preamble part, and determine the initial transmit power according to the receive power of the pilot channel, the transmit power of the pilot channel, the uplink interference power, the fixed compensating power, and the power parameter corresponding to the PRACH preamble part.

Optionally, the receiver 1901 is further configured to receive the second number of sending times that is sent by the network-side device through an AICH, where the second number of sending times is the number of times that the user-side device has sent the PRACH preamble part when the network-side device receives the PRACH preamble part.

The transmitter 1903 is further configured to: at a next time of accessing the network-side device, send a redetermined PRACH preamble part to the network-side device by using the second number of sending times.

Further, the transmitter 1903 is further configured to: add the repetition factor to a control part in the PRACH message part, and send the control part in the PRACH message part to the network-side device through a DPCCH; or configured to add the repetition factor to an E-DPCCH, and send the E-DPCCH to the network-side device.

Optionally, the correspondence between coverage level and repetition factor further includes a feature code range, corresponding to the coverage level, of the PRACH preamble part.

Alternatively, the transmitter 1903 is further configured to send a feature code corresponding to the PRACH preamble part to the network-side device, so that the network-side device determines the repetition factor according to the feature code range to which the feature code corresponding to the PRACH preamble part belongs.

Optionally, the receiver 1901 is further configured to receive the correspondence between coverage level and repetition factor, where the correspondence between coverage level and repetition factor is sent by the network-side device by means of broadcast or dedicated signaling.

The user-side device provided by this embodiment may perform the information transmission method described in any one of the foregoing Embodiment 1 to Embodiment 5. A specific implementation process and beneficial effect thereof are similar to those in the foregoing embodiments, and are not further described herein.

Embodiment 15

Figure 20:
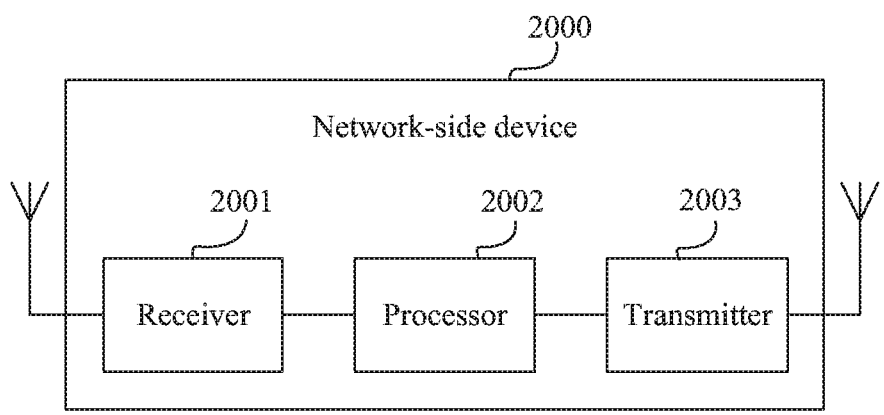
FIG. 20 is a schematic structural diagram of a network-side device according to Embodiment 15 of the present invention.

FIG. 20 is a schematic structural diagram of a network-side device according to Embodiment 15 of the present invention. Embodiment 15 of the present invention provides a network-side device, which may perform the information transmission method provided by the foregoing Embodiment 6.

As shown in FIG. 20, the network-side device 2000 includes a receiver 2001, a processor 2002, and a transmitter 2003.

The receiver 2001 is configured to receive a repetition factor sent by a user-side device, and receive a PRACH message part that is sent by the user-side device by using the repetition factor, where the repetition factor is a repetition factor corresponding to a coverage level and is determined by the user-side device by querying, according to the determined coverage level, a correspondence between coverage level and repetition factor.

Further, the repetition factor includes an uplink repetition factor and a downlink repetition factor.

The receiver 2001 is further configured to receive the uplink repetition factor and the downlink repetition factor that are sent by the user-side device, and receive the uplink repetition factor and the downlink repetition factor that are sent by the user-side device.

The transmitter 2003 is configured to send downlink information to the user-side device by using the downlink repetition factor.

Optionally, the uplink repetition factor is the number of repetition times that the user-side device sends the PRACH message part, and the downlink repetition factor is the number of repetition times that the network-side device sends the downlink information.

Further, the receiver 2001 is further configured to: before receiving the PRACH message part that is sent by the user-side device by using the repetition factor, receive a PRACH preamble part that is sent by the user-side device according to an initial transmit power by using the first number of sending times, where the initial transmit power is an initial transmit power of the PRACH preamble part and is determined by the user-side device according to a receive power of a pilot channel, a transmit power of the pilot channel, an uplink interference power, and a fixed compensating power, where the first number of sending times is the initial number of times that the PRACH preamble part is sent.

Optionally, the transmitter 2003 is further configured to: before the receiver 2001 receives the PRACH preamble part that is sent by the user-side device according to the initial transmit power by using the first number of sending times, send the transmit power of the pilot channel, the uplink interference power, and the fixed compensating power to the user-side device by means of broadcast.

Alternatively, the initial transmit power is the initial transmit power of the PRACH preamble part and is determined by the user-side device according to the receive power of the pilot channel, the transmit power of the pilot channel, the uplink interference power, the fixed compensating power, and a power parameter corresponding to the PRACH preamble part, where the power parameter corresponding to the PRACH preamble part is a power parameter determined by the user-side device according to the first number of sending times.

Further, the transmitter 2003 is further configured to send the second number of sending times to the user-side device through an AICH, so that when the user-side device accesses the network-side device next time, the user-side device sends a redetermined PRACH preamble part to the network-side device by using the second number of sending times, where the second number of sending times is the number of times that the user-side device has sent the PRACH preamble part when the network-side device receives the PRACH preamble part.

Optionally, the receiver 2001 is further configured to: receive the repetition factor carried in a control part in the PRACH message part that is sent by the user-side device through a DPCCH; or configured to receive the repetition factor carried in an E-DPCCH sent by the user-side device.

Optionally, the receiver 2001 is further configured to receive a feature code sent by the user-side device and corresponding to the PRACH preamble part.

The processor 2002 is further configured to determine, according to the feature code corresponding to the PRACH preamble part, a feature code range to which the feature code corresponding to the PRACH preamble part belongs, and determine the repetition factor according to the feature code range to which the feature code corresponding to the PRACH preamble part belongs and the correspondence between coverage level and repetition factor, where the correspondence between coverage level and repetition factor includes the feature code range, corresponding to the coverage level, of the PRACH preamble part.

Optionally, the transmitter 2003 is further configured to: before the receiver 2001 receives the repetition factor sent by the user-side device, send the correspondence between coverage level and repetition factor to the user-side device by means of broadcast or dedicated signaling.

The network-side device provided by this embodiment may perform the information transmission method described in the foregoing Embodiment 6. A specific implementation process and beneficial effect thereof are similar to those in the foregoing embodiment, and are not further described herein.

Embodiment 16

Figure 21:
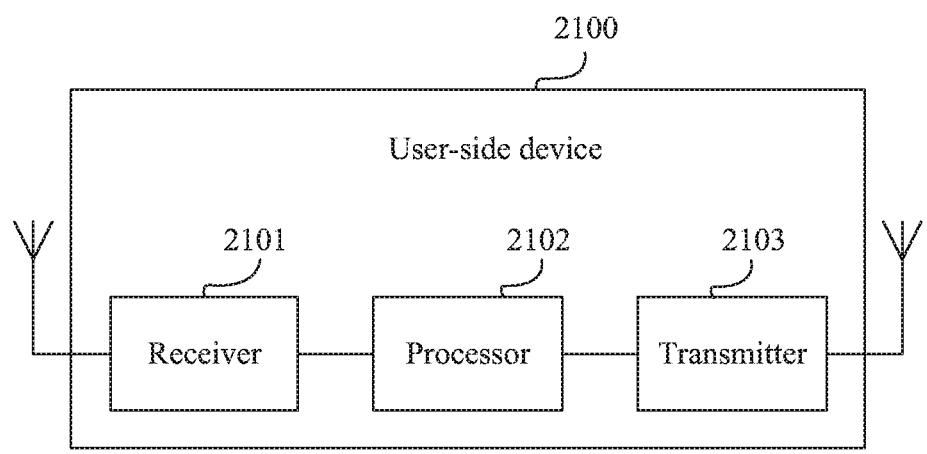
FIG. 21 is a schematic structural diagram of a user-side device according to Embodiment 16 of the present invention.

FIG. 21 is a schematic structural diagram of a user-side device according to Embodiment 16 of the present invention. Embodiment 16 of the present invention provides a user-side device, which may perform the information transmission method in the foregoing Embodiment 8.

As shown in FIG. 21, the user-side device 2100 may include a receiver 2101, a processor 2102, and a transmitter 2103.

The processor 2102 is configured to determine a transport block quantity of a PRACH message part.

The transmitter 2103 is configured to send the transport block quantity to a network-side device, and send multiple transport blocks to the network-side device by using the transport block quantity.

Optionally, the processor 2102 is further configured to determine the transport block quantity according to a size of the PRACH message part and a size of a single transport block.

Optionally, the transmitter 2103 is further configured to: add the transport block quantity to a control part in the PRACH message part, and send the control part in the PRACH message part to the network-side device through a DPCCH; or add the transport block quantity to an E-DPCCH, and send the E-DPCCH to the network-side device.

Optionally, the transmitter 2103 is further configured to send a feature code corresponding to a PRACH preamble part to the network-side device, so that the network-side device determines the transport block quantity according to a feature code range to which the feature code corresponding to the PRACH preamble part belongs and a preset correspondence between transport block quantity and feature code range, where the correspondence between transport block quantity and feature code range includes the feature code range, corresponding to the transport block quantity, of the PRACH preamble part.

The user-side device provided by this embodiment may perform the information transmission method in the foregoing Embodiment 8. A specific implementation process and beneficial effect thereof are similar to those in the foregoing embodiment, and are not further described herein.

Embodiment 17

Figure 22:
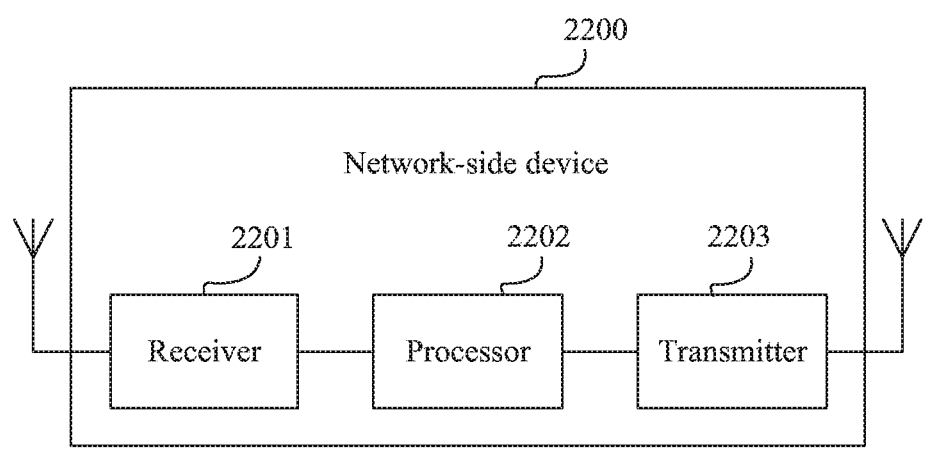
FIG. 22 is a schematic structural diagram of a network-side device according to Embodiment 17 of the present invention.

FIG. 22 is a schematic structural diagram of a network-side device according to Embodiment 17 of the present invention. Embodiment 17 of the present invention provides a network-side device, which may perform the information transmission method provided by the foregoing Embodiment 9.

As shown in FIG. 22, the network-side device 2200 may include a receiver 2201, a processor 2202, and a transmitter 2203.

The receiver 2201 is configured to receive a transport block quantity sent by a user-side device, and receive multiple transport blocks that are sent by the user-side device to the network-side device by using the transport block quantity, where the transport block quantity is a transport block quantity of a PRACH message part and is determined by the user-side device.

The processor 2202 is configured to determine the PRACH message part according to the transport block quantity and the multiple transport blocks.

Optionally, the receiver 2201 is further configured to: receive the transport block quantity carried in a control part in the PRACH message part that is sent by the user-side device through a DPCCH; or receive the transport block quantity carried in an E-DPCCH sent by the user-side device.

Optionally, the receiver 2201 is further configured to receive a feature code sent by the user-side device and corresponding to a PRACH preamble part.

The processor 2202 is further configured to determine, according to the feature code corresponding to the PRACH preamble part, a feature code range to which the feature code corresponding to the PRACH preamble part belongs, and determine the transport block quantity according to the feature code range to which the feature code corresponding to the PRACH preamble part belongs and a preset correspondence between transport block quantity and feature code range.

The correspondence between transport block quantity and feature code range includes the feature code range, corresponding to the transport block quantity, of the PRACH preamble part.

The network-side device provided by this embodiment may perform the information transmission method in the foregoing Embodiment 9. A specific implementation process and beneficial effect thereof are similar to those in the foregoing embodiment, and are not further described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
sending, by a user-side device, a repetition factor, to a network-side device, wherein the repetition factor comprises an indication of a first number of repetition times, the first number of repetition times being a number of times the user-side device sends a physical random access channel (PRACH) message part;
sending, by the user-side device, the PRACH message part to the network-side device using the repetition factor, wherein using the repetition factor comprises repeatedly sending the PRACH message part to the network-side device a number of times equal to the first number of repetition times; and
sending, by the user-side device, a PRACH preamble part to the network-side device according to an initial transmit power using a first number of sending times and before receiving the PRACH message part, wherein the initial transmit power is an initial transmit power of the PRACH preamble part and the initial transmit power is determined by the user-side device according to a receive power of a pilot channel, a transmit power of the pilot channel, an uplink interference power, a fixed compensating power, and a power parameter corresponding to the PRACH preamble part, wherein the first number of sending times is an initial number of times that the PRACH preamble part is sent, and wherein the power parameter corresponding to the PRACH preamble part is a power parameter determined by the user-side device according to the first number of sending times.

2. The method according to claim 1, wherein the method further comprises:
determining, by the user-side device, a coverage level of the user-side device;
querying, by the user-side device according to the coverage level, a correspondence between the coverage level and the repetition factor; and
determining the repetition factor corresponding to the coverage level, before sending the repetition factor to the network-side device.

3. The method according to claim 2, wherein the repetition factor comprises an uplink repetition factor and a downlink repetition factor, and wherein sending the PRACH message part to the network-side device comprises:
sending, by the user-side device, the PRACH message part to the network-side device using the uplink repetition factor; and
wherein sending the repetition factor to the network-side device comprises:
sending, by the user-side device, the uplink repetition factor and the downlink repetition factor to the network-side device, so that the network-side device can receive, by using the uplink repetition factor, the PRACH message part sent by the user-side device, and the network-side device can send, by using the downlink repetition factor, downlink information to the user-side device.

4. The method according to claim 3, wherein the uplink repetition factor is the first number of repetition times, and wherein the downlink repetition factor is a second number of repetition times, the second number of repetition times being a number of times that the network-side device sends the downlink information.

5. The method according to claim 2, wherein determining the coverage level of the user-side device comprises:
determining, by the user-side device, the coverage level according to a path loss level.

6. A method, comprising:
receiving, by a network-side device, a repetition factor sent by a user-side device, wherein the repetition factor comprises an indication of a first number of repetition times, the first number of repetition times being a number of times the user-side device sends a physical random access channel (PRACH) message part, wherein the repetition factor corresponds to a coverage level, and wherein the repetition factor is determined by the user-side device by querying, according to the coverage level, a correspondence between the coverage level and the repetition factor;
receiving, by the network-side device, the PRACH message part that is sent by the user-side device using the repetition factor, wherein using the repetition factor comprises repeatedly sending the PRACH message part to the network-side device a number of times equal to the first number of repetition times; and
receiving, by the network-side device, a PRACH preamble part that is sent by the user-side device according to an initial transmit power using a first number of sending times, before receiving the PRACH message part, wherein the initial transmit power is an initial transmit power of the PRACH preamble part and the initial transmit power is determined by the user-side device according to a receive power of a pilot channel, a transmit power of the pilot channel, an uplink interference power, a fixed compensating power, and a power parameter corresponding to the PRACH preamble part, wherein the first number of sending times is an initial number of times that the PRACH preamble part is sent, and wherein the power parameter corresponding to the PRACH preamble part is a power parameter determined by the user-side device according to the first number of sending times.

7. The method according to claim 6, wherein the repetition factor comprises an uplink repetition factor and a downlink repetition factor, and wherein receiving the repetition factor sent by a user-side device comprises:
receiving, by the network-side device, the uplink repetition factor and the downlink repetition factor that are sent by the user-side device;
wherein receiving, by the network-side device, the PRACH message part that is sent by the user-side device comprises receiving, by the network-side device, the PRACH message part that is sent by the user-side device using the uplink repetition factor; and
wherein the method further comprises sending, by the network-side device, downlink information to the user-side device using the downlink repetition factor.

8. The method according to claim 7, wherein the uplink repetition factor is the first number of repetition times, and the downlink repetition factor is a second number of repetition times, the second number of repetition times being a number of times that the network-side device sends the downlink information.

9. The method according to claim 6, wherein receiving the repetition factor sent by the user-side device comprises:
receiving, by the network-side device, the repetition factor carried in a control part in the PRACH message part that is sent by the user-side device through a dedicated physical control channel (DPCCH) or carried in an enhanced dedicated physical control channel (E-DPCCH) sent by the user-side device.

10. A user-side device, comprising:
a processor; and
a non-transitory computer readable storage medium storing a program for execution by the processor, the program including instructions to
send a repetition factor to a network-side device, wherein the repetition factor comprises an indication of a first number of repetition times, the first number of repetition times being a number of times the user-side device sends a physical random access channel (PRACH) message part,
send the PRACH message part to the network-side device using the repetition factor, wherein using the repetition factor comprises repeatedly sending the PRACH message part to the network-side device a number of times equal to the first number of repetition times, and
send a PRACH preamble part to the network-side device according to an initial transmit power using a first number of sending times and before receiving the PRACH message part, wherein the initial transmit power is an initial transmit power of the PRACH preamble part and the initial transmit power is determined by the user-side device according to a receive power of a pilot channel, a transmit power of the pilot channel, an uplink interference power, a fixed compensating power, and a power parameter corresponding to the PRACH preamble part, wherein the first number of sending times is an initial number of times that the PRACH preamble part is sent, and wherein the power parameter corresponding to the PRACH preamble part is a power parameter determined by the user-side device according to the first number of sending times.

11. The user-side device according to claim 10, wherein the instructions further comprise instructions to:
determine a coverage level of the user-side device before sending the repetition factor to the network-side device;
query, according to the coverage level, a correspondence between coverage level and repetition factor; and
determine the repetition factor corresponding to the coverage level.

12. The user-side device according to claim 11, wherein the repetition factor comprises an uplink repetition factor and a downlink repetition factor, wherein the instructions to send the PRACH message part to the network-side device using the uplink repetition factor; and
wherein the instructions to send the repetition factor to the network-side device, comprises instructions to send the uplink repetition factor and the downlink repetition factor to the network-side device, so that the network-side device can receive, by using the uplink repetition factor, the PRACH message part sent by the user-side device, and the network-side device can send, by using the downlink repetition factor, downlink information to the user-side device.

13. The user-side device according to claim 12, wherein the uplink repetition factor is the first number of repetition times, and the downlink repetition factor is a second number of repetition times, the second number of repetition times being a number of times that the network-side device sends the downlink information.

14. The user-side device according to claim 11, wherein instructions to determine the coverage level of the user-side device comprise instructions to:
determine the coverage level according to a path loss level.

15. A network-side device, comprising:
a processor; and
a non-transitory computer readable storage medium storing a program for execution by the processor, the program including instructions to
receive a repetition factor sent by a user-side device, wherein the repetition factor comprises an indication of a first number of repetition times, the first number of repetition times being a number of times the user-side device sends a physical random access channel (PRACH) message part, wherein the repetition factor is a repetition factor corresponding to a coverage level and is determined by the user-side device by querying, according to the coverage level, a correspondence between coverage level and repetition factor,
receive the PRACH message part that is sent by the user-side device using the repetition factor, wherein using the repetition factor comprises repeatedly sending the PRACH message part to the network-side device a number of times equal to the first number of repetition times, and
receive a PRACH preamble part that is sent by the user-side device according to an initial transmit power using a first number of sending times, before receiving the PRACH message part, wherein the initial transmit power is an initial transmit power of the PRACH preamble part and the initial transmit power is determined by the user-side device according to a receive power of a pilot channel, a transmit power of the pilot channel, an uplink interference power, a fixed compensating power, and a power parameter corresponding to the PRACH preamble part, wherein the first number of sending times is an initial number of times that the PRACH preamble part is sent, and the power parameter corresponding to the PRACH preamble part is a power parameter determined by the user-side device according to the first number of sending times.

16. The network-side device according to claim 15, wherein the repetition factor comprises an uplink repetition factor and a downlink repetition factor, wherein the instructions to receive the repetition factor comprise instructions to:
- receive the uplink repetition factor and the downlink repetition factor that are sent by the user-side device;
- wherein the instructions to receive the PRACH message part comprises instructions to receive the PRACH message part that is sent by the user-side device by using the uplink repetition factor; and
- wherein the instructions further comprise instructions to send downlink information to the user-side device using the downlink repetition factor.

17. The network-side device according to claim 16, wherein the uplink repetition factor is the first number of repetition times, and the downlink repetition factor is a second number of repetition times, the second number of repetition times being a number of times that the network-side device sends the downlink information.

18. The network-side device according to claim 15, wherein the instructions to receive the repetition factor comprise instructions to:
- receive the repetition factor carried in a control part in the PRACH message part that is sent by the user-side device through a dedicated physical control channel (DPCCH) or that is carried in an enhanced dedicated physical control channel (E-DPCCH) sent by the user-side device.

* * * * *